(12) United States Patent
Robertson

(10) Patent No.: US 10,818,119 B2
(45) Date of Patent: *Oct. 27, 2020

(54) RADIO FREQUENCY ANTENNA AND SYSTEM FOR PRESENCE SENSING AND MONITORING

(71) Applicant: Yikes LLC

(72) Inventor: William Benjamin Robertson, Indianapolis, IN (US)

(73) Assignee: Yikes LLC, Monticello, IN (US)

(*) Notice: Subject to any disclaimer, the term of this patent is extended or adjusted under 35 U.S.C. 154(b) by 0 days.

This patent is subject to a terminal disclaimer.

(21) Appl. No.: 15/722,802

(22) Filed: Oct. 2, 2017

(65) Prior Publication Data

US 2018/0033226 A1    Feb. 1, 2018

Related U.S. Application Data

(63) Continuation-in-part of application No. 15/131,115, filed on Apr. 18, 2016, now Pat. No. 10,085,135, which is a continuation-in-part of application No. 15/007,797, filed on Jan. 27, 2016, now Pat. No.
(Continued)

(51) Int. Cl.
*G07C 9/00* (2020.01)
*H04W 12/06* (2009.01)
(Continued)

(52) U.S. Cl.
CPC .......... *G07C 9/28* (2020.01); *G07C 9/00571* (2013.01); *G07C 9/00904* (2013.01); *G07C 9/20* (2020.01);
(Continued)

(58) Field of Classification Search
None
See application file for complete search history.

(56) References Cited

U.S. PATENT DOCUMENTS 4,401,260 A    8/1983   Grant
4,868,914 A    9/1989   Yamashita
(Continued)

FOREIGN PATENT DOCUMENTS

EP    1965595 A1    9/2008
JP    08184236 A    7/1996
(Continued)

OTHER PUBLICATIONS

Search report and written opinion from PCT application No. PCT/US18/53347 dated Dec. 12, 2018.
(Continued)

*Primary Examiner* — Chico A Foxx
(74) *Attorney, Agent, or Firm* — Woodard, Emhardt, Henry, Reeves & Wagner, LLP

(57) ABSTRACT

A wireless device system employs short-range wireless communication to require the proximity of a user device to a defined area prior to communicating a request or notification to the wireless user device. The system authenticates a request and the proximity of the user to or within the defined area prior to transmitting a command, request, or notification to the user or a third party. Additionally, the system uses an access node configured to shape the radiation pattern of short-range wireless communications to better determine the position of a user proximate in or around a defined area.

6 Claims, 14 Drawing Sheets

Related U.S. Application Data 9,558,604, which is a continuation-in-part of application No. 14/740,649, filed on Jun. 16, 2015, now Pat. No. 9,367,975, which is a continuation-in-part of application No. 14/307,667, filed on Jun. 18, 2014, now Pat. No. 9,129,450, which is a continuation of application No. 15/236,103, filed on Aug. 5, 2009, now Pat. No. 8,791,790, which is a continuation-in-part of application No. 12/368,601, filed on Feb. 10, 2009, now abandoned.

(51) Int. Cl.

| | | |
|---|---|---|
| *H04L 29/06* | (2006.01) | |
| *H04W 88/06* | (2009.01) | |
| *G07C 9/28* | (2020.01) | |
| *H04W 4/021* | (2018.01) | |
| *H04W 4/80* | (2018.01) | |
| *H04W 12/08* | (2009.01) | |
| *G07C 9/20* | (2020.01) | |
| *G06Q 10/02* | (2012.01) | |
| *H04L 29/08* | (2006.01) | |
| *H04B 5/00* | (2006.01) | |
| *G06Q 50/12* | (2012.01) | |
| *H04W 12/00* | (2009.01) | |

(52) U.S. Cl.
CPC .......... *H04L 63/08* (2013.01); *H04L 63/0876* (2013.01); *H04W 4/021* (2013.01); *H04W 4/80* (2018.02); *H04W 12/06* (2013.01); *H04W 12/08* (2013.01); *G06Q 10/02* (2013.01); *G06Q 50/12* (2013.01); *G07C 2009/00793* (2013.01); *G07C 2209/64* (2013.01); *H04B 5/0025* (2013.01); *H04L 63/0853* (2013.01); *H04L 63/0861* (2013.01); *H04L 67/26* (2013.01); *H04W 12/00503* (2019.01); *H04W 88/06* (2013.01)

(56) References Cited

U.S. PATENT DOCUMENTS

| | | | |
|---|---|---|---|
| 5,014,050 A | 5/1991 | Lewiner et al. | |
| 5,337,588 A | 8/1994 | Chhatwal | |
| 5,614,703 A | 3/1997 | Martin et al. | |
| 5,898,904 A | 4/1999 | Wang | |
| 5,990,885 A | 11/1999 | Gopinath | |
| 6,553,238 B1 | 4/2003 | Ginzel et al. | |
| 6,674,403 B2 | 1/2004 | Gray et al. | |
| 6,772,331 B1 | 8/2004 | Hind et al. | |
| 6,900,603 B1 | 5/2005 | Del Vecchino | |
| 7,012,503 B2 | 3/2006 | Nielsen | |
| 7,039,435 B2 | 5/2006 | McDowell et al. | |
| 7,114,178 B2 | 9/2006 | Dent et al. | |
| 7,315,823 B2 * | 1/2008 | Brondrup | G06Q 10/02 705/5 |
| 7,315,824 B2 | 1/2008 | Chen et al. | |
| 7,403,743 B2 | 7/2008 | Welch | |
| 7,565,411 B1 | 7/2009 | Turcotte | |
| 7,769,394 B1 | 8/2010 | Zhu | |
| 7,953,392 B2 | 5/2011 | Karstens | |
| 8,219,114 B2 | 7/2012 | Larsen | |
| 8,344,953 B1 | 1/2013 | Gilbrech et al. | |
| 8,428,550 B2 | 4/2013 | Larsen | |
| 8,880,434 B2 * | 11/2014 | Bemmel | G06Q 20/20 705/67 |
| 8,942,704 B1 | 1/2015 | Vivanco et al. | |
| 9,666,000 B1 * | 5/2017 | Schoenfelder | G07C 9/00111 |
| 2002/0055879 A1 | 5/2002 | Wengrovitz et al. | |
| 2002/0099945 A1 | 7/2002 | McLintock | |
| 2002/0183008 A1 | 12/2002 | Menard | |
| 2003/0023463 A1 | 1/2003 | Dombroski et al. | |
| 2003/0064732 A1 | 4/2003 | McDowell et al. | |
| 2003/0118237 A1 | 6/2003 | Laird | |
| 2003/0149576 A1 | 8/2003 | Sunyich | |
| 2003/0167273 A1 * | 9/2003 | Alexander | G06F 16/735 |
| 2003/0208386 A1 | 11/2003 | Brondrup | |
| 2004/0034537 A1 * | 2/2004 | Gengarella | G06Q 10/02 705/5 |
| 2004/0059815 A1 | 3/2004 | Buckingham et al. | |
| 2004/0196182 A1 * | 10/2004 | Unnold | G01S 5/0027 342/357.25 |
| 2005/0051620 A1 | 3/2005 | DiLuoffo et al. | |
| 2005/0094610 A1 | 5/2005 | de Clerq et al. | |
| 2005/0210283 A1 | 9/2005 | Kato | |
| 2005/0241003 A1 | 10/2005 | Sweeney et al. | |
| 2005/0261833 A1 | 11/2005 | Brosius et al. | |
| 2006/0056353 A1 | 3/2006 | McBride | |
| 2006/0106930 A1 | 5/2006 | Shaffer | |
| 2006/0116127 A1 | 6/2006 | Wilhoite et al. | |
| 2006/0147043 A1 * | 7/2006 | Mann | H04L 41/0893 380/270 |
| 2006/0152336 A1 | 7/2006 | Turkovich, Jr. et al. | |
| 2006/0154687 A1 | 7/2006 | McDowell et al. | |
| 2006/0164205 A1 | 7/2006 | Buckingham | |
| 2006/0183462 A1 | 8/2006 | Kolehmainen | |
| 2006/0187034 A1 | 8/2006 | Styers et al. | |
| 2006/0236363 A1 * | 10/2006 | Heard | H04L 63/101 726/1 |
| 2007/0094716 A1 * | 4/2007 | Farino | G07C 9/00103 726/5 |
| 2007/0176739 A1 | 8/2007 | Raheman | |
| 2008/0137631 A1 | 6/2008 | de Clerq et al. | |
| 2008/0176580 A1 | 7/2008 | Dery | |
| 2008/0191009 A1 * | 8/2008 | Gressel | G06Q 10/02 235/382 |
| 2008/0194226 A1 | 8/2008 | Rivas et al. | |
| 2008/0214209 A1 | 9/2008 | Ratnakar | |
| 2008/0221862 A1 | 9/2008 | Guo et al. | |
| 2008/0301580 A1 | 12/2008 | Hjelmeland Alams et al. | |
| 2009/0066476 A1 | 3/2009 | Raheman | |
| 2009/0093234 A1 | 4/2009 | Cai et al. | |
| 2009/0119698 A1 | 5/2009 | Kuijlaars | |
| 2009/0261965 A1 | 10/2009 | Cum | |
| 2009/0299777 A1 | 12/2009 | Silberman | |
| 2009/0313046 A1 | 12/2009 | Badgett et al. | |
| 2010/0057501 A1 | 3/2010 | Mohammed | |
| 2010/0082491 A1 * | 4/2010 | Rosenblatt | G06Q 10/02 705/65 |
| 2011/0102131 A1 | 5/2011 | de Clerq et al. | |
| 2011/0230211 A1 * | 9/2011 | Kim | G06F 21/71 455/456.4 |
| 2013/0166917 A1 * | 6/2013 | Granbery | H04L 9/3247 713/179 |
| 2014/0111334 A1 * | 4/2014 | Carpenter | G08B 13/14 340/539.26 |
| 2014/0157838 A1 | 6/2014 | Nave | |
| 2014/0340032 A1 | 11/2014 | Curtis | |
| 2015/0151515 A1 | 6/2015 | Skepton | |
| 2015/0324851 A1 * | 11/2015 | Campbell | G06Q 30/0267 705/14.58 |
| 2015/0382436 A1 | 12/2015 | Kelly et al. | |
| 2016/0173672 A1 | 6/2016 | Boyce | |
| 2016/0210799 A1 | 7/2016 | Robertson et al. | |
| 2016/0300413 A1 | 10/2016 | Robertson et al. | |
| 2018/0174076 A1 * | 6/2018 | Fukami | G06Q 10/02 |
| 2019/0122196 A1 * | 4/2019 | Lauria | G07G 1/0036 |

FOREIGN PATENT DOCUMENTS

| | | |
|---|---|---|
| JP | 2002013324 A | 1/2002 |
| JP | 2003138816 | 5/2003 |
| KR | 10-2006-0088613 | 8/2006 |

OTHER PUBLICATIONS

Signature by VingCard—VingCard Elsafe—Assa Abloy— "VingCard Outpacing Industry in RFID/NFC Skill: Displays Electronic Lock Advancement for Remote Hotel Check-in/Check-out AT IH/MRS" Paris Nov. 6, 2008—VingCard Elsafe s.a.s.—37, rue

(56) References Cited

OTHER PUBLICATIONS

Adam Ledoux—BP 46—92 404 Courbevoie Cedex France <http://www.hotel-online.com/News/PR2008_4th/Nov08_VingCardNFC.html> Retrieved Nov. 25, 2015.

* cited by examiner

RADIO FREQUENCY ANTENNA AND SYSTEM FOR PRESENCE SENSING AND MONITORING

CROSS REFERENCE TO RELATED APPLICATIONS

The present application is a continuation-in-part of U.S. patent application Ser. No. 15/131,115 filed on Apr. 18, 2016, which is a continuation-in-part of U.S. patent application Ser. No. 15/007,797 filed on Jan. 27, 2016, which is a continuation-in-part of U.S. patent application Ser. No. 14/740,649 filed on Jun. 16, 2015, which is a continuation-in-part of U.S. patent application Ser. No. 14/307,667 filed Jun. 18, 2014, which is a continuation of U.S. patent application Ser. No. 12/536,103 filed Aug. 5, 2009, which is a continuation-in-part of U.S. patent application Ser. No. 12/368,601 filed Feb. 10, 2009, all of which are hereby incorporated by reference to the extent not inconsistent.

FIELD OF THE INVENTION

The present invention generally relates to an access system including a wireless user device and a proximity verification device. More particularly, the present invention pertains to a radio frequency patch antenna design and radiation pattern shaping to be used for receiving a request for access from a user's mobile phone and confirms its using periodically changing access codes.

BACKGROUND

In the United States alone there are more than 4.5 million hotel rooms available to travelers. Currently, these hotel rooms have an industry-wide occupancy rate of just over 60%, with the occupancy rates of various geographic areas and individual hotels varying wildly. This occupancy rate often drastically affects the bottom line of a hotel or hotel chain. To increase their occupancy rate, and thus their profitability, hotels make every attempt to please their guests in order to encourage them to return. In order to please their guests, and lure new ones, hotels have continuously added amenities, such as on-site spas, restaurants, fitness centers, and in-room coffee machines or mini-bars.

In addition to these additional amenities, hotels have adopted a variety of different check-in procedures to minimize the time required for a guest to check-in. These procedures include adopting electronic key cards as opposed to mechanical keys, which enhances guest security and allows the hotel to change to a new room key, alleviating the need for the guest to return the keys to the front desk at check-out. However, even these procedures still present a distracting delay to a hotel's most valuable customers, business travelers. To increase loyalty amongst these frequent travelers, among others, most major hotel chains have invested tremendous assets in developing rewards programs, such as the Hilton HHonors® Program. The goal of these programs is to allow hotel chains to better understand the needs of travelers and make their stay as streamlined as possible. For instance, some hotels provide express check-in for a select set of their guests, while others provide check-in/check-out over the Internet or via a computer kiosk located in the hotel lobby. While these advances have certainly increased the occupancy rates of the various major hotel chains, they have not yet solved the problem of fully automating the guest check-in/check-out process, thereby allowing a guest to arrive at their hotel and enter their room without any additional time-consuming steps.

Similarly, these issues can be found in a number of situations that require secured access into a building, facility, or designated area, such as for example airline gates, concert or other event gates, and public transportation gates. These structures can use wireless access points that can communicate with a user device having the required authentication to allow a user to enter the structure. These access points can use directional antennas that have associated back lobes that emit the signal in the opposite direction. When two patch antennas are placed proximate to one another, such as in a back-to-back orientation and face opposite directions, the near field signal strengths do not reliably indicate or differentiate between the two antennas due to the back lobes. For applications that require determining when user is inside or outside of a structure, this differentiation critical. Current methods of reducing back lobe radiation of patch antennas creates a highly focused directional antenna, meaning that the main lobe bandwidth is also reduced while the gain directly in front of the antenna increases.

This disclosure is applicable in all areas where customers are waiting in a queue for entrance or access to a structure, vehicle, venue, or any other type of restricted area, such as a database, data network, or server, among others. Similarly, this disclosure is directed to an access system for electronic transactions for both access, presence detection, movement tracking, and locating a user. The transactions can be for multiple purposes, including but not limited to, access to a location, charging an e-wallet, providing information, and providing customer loyalty recognition, among others. Additionally, this disclosure is applicable to various radio communications and short-range wireless communications that can be used for communicating between a device and an access point. There is a need to better provide frictionless communication between a user device and a third party system for detecting a user's presence and providing easy access to a restricted area for user. This access can include providing payment methods for various retail situations, as well as, location tracking an monitoring of a user device.

DETAILED DESCRIPTION OF THE INVENTION

Figure 1A:
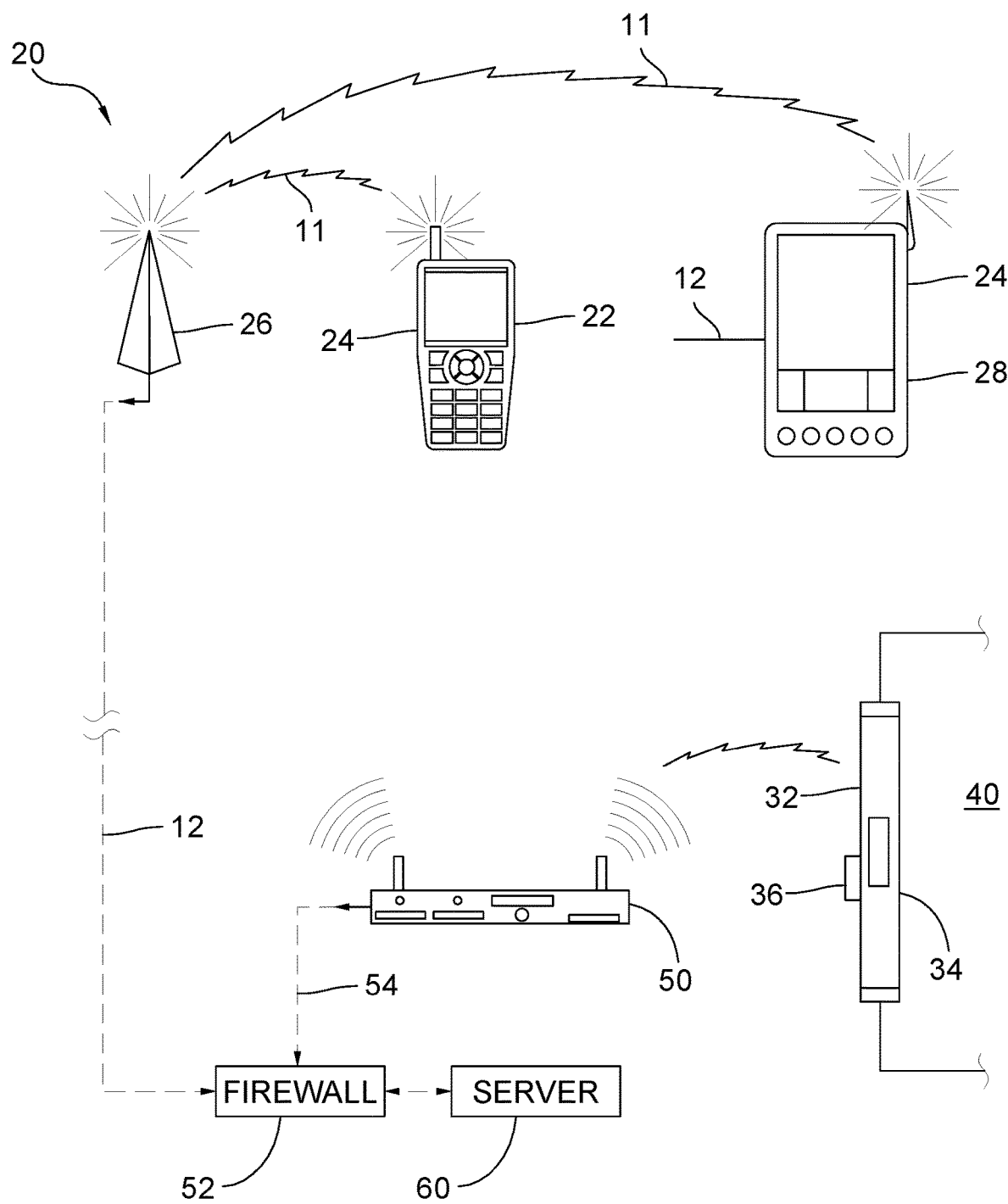
FIG. 1A is a diagrammatic view of an access system according to one implementation of the present invention.

For the purposes of promoting and understanding of the principles of the invention, reference will now be made to the embodiment illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Currently, systems exist, such as the Signature radio frequency identification (RFID) or near field communication (NFC) systems from VingCard, which can provide a user access to a hotel room using their mobile phone. However, such systems an require a specialized transceiver within the door of the hotel room and the user's mobile phone such that the two may communicate using a short-range wireless technology. Only a slight fraction of existing mobile phones are currently capable of being used with such systems, and it may be quite some time before such technology is common, if ever. Furthermore, many point-to-point prior art systems are unable to communicate directly with the door locks once deployed. The only way updating may be accomplished is through a user's device, which is not an inherently trusted source.

Other technologies exist for remotely allowing a user to monitor and control the open or closed state of an entryway, such as a garage door, using a cell phone connected to a controller over the Internet. However, these technologies do not provide sufficient security as they are designed for purposes other than secure access control. For example, these systems allow a user to send a command to open a door from any location where they have Internet access. However, their unlimited availability also introduces several significant vulnerabilities to unauthorized access. As such, many problems exist in the prior art which are solved by the secure access system of the present invention.

As shown in FIG. 1A, one embodiment of an access system 20 advantageously permits a user to access a structure 40 using a wireless device 24. In addition to lodging and workplace access systems, it will be appreciated that similar embodiments of the access system to be described also encompass systems for controlling access to other structures or openings/doors thereof. In the illustrated embodiment, according to FIG. 1A, the described system comprises an access system 20 for allowing a hotel guest to access their assigned hotel room 40 using a wireless device 24, which in the preferred form, is the user's Bluetooth® capable cell phone 22 or other wireless appliance 28. As such, it will be understood that many of the descriptions herein with respect to a hotel environment and the like are meant for illustrative purposes and that the concepts herein are generally applicable to a general safety and security access system and are not limited to only a hotel room access system.

Examples of other structures for which the novel access system may be adapted include other rooms within a hotel (i.e. workout rooms, pools, VIP lounges), office buildings, school/university buildings, warehouses, and portions thereof, event ticket gates/turnstiles, airplanes, airport security points, movie theatres, safety deposit boxes, mailboxes, lockers, or other enclosures for which providing selective user access is desired. Other applications that may not necessarily be structures, but shall be referred to generally herein as a "structure" in this application can include any physical area, such as for example, parking lots and garages, public transit access gates, public buses, railroad terminals, subway terminals, other transportation gates and checkpoints. A "restricted area" will be understood to include "structures" but may also include other physical and virtual locations that may be accessed used the invention of the present disclosure. These virtual areas, can include databases, servers, data networks, computers, e-ticketing and e-wallets for providing payments or ticketing services to the user.

Additionally, as explained later, access system 20 may also provide the user with various features including, but not limited to, automated check-in/check-out via an electronic kiosk or their wireless device, access to restricted members-only areas or lounges, and the like. Other features of access system 20 include the ability to request various reports on activity relating to the entry of various structures. Illustratively, some embodiments of the access system 20 allow the system to provide an activity log that reports the access requests during a specified period of time or for a specified user.

As shown in FIG. 1A, according to the illustrative embodiment, the access system 20 interfaces with one or more wireless devices 24, such as cell phone 22 or wireless appliance 28, to allow a user to access their assigned hotel room. Cell phone 22 is preferably a mobile phone used for mobile voice or data communication over a network of cell towers. In addition to the standard voice function of a mobile phone, cell phone 22 preferably supports many additional services, and accessories, such as SMS for text messaging, email, packet switching for access to the Internet, Bluetooth, infrared, and GPS.

Illustratively, in some embodiments, the access system 20 is operably coupled to data network 12. Data network 12 is preferably the Internet, which is a TCP/IP based global network; however, the user of the term "Internet" herein shall be understood to refer to at least a portion of any public interconnected electronic network which interchanges data by packet-switching.

More specifically, access system 20 may utilize cellular phone network 11 and data network 12 to interface with a wireless device 24, such as cell phone 22. Cellular phone network 11 may comprise a variety of communication networks, including without limitation the universal mobile telecommunications system (UMTS), global system for mobile communication (GSM), and a code division of multiple access (CDMA) network, or similar technology. Cellular phone network 11 utilizes cell tower 26 to establish a wireless bi-directional transmission link between data network 12 and cell phone 22, which may comprise a wireless data link, such as the Evolution-Data Optimized (EVDO), Enhanced Data rates for GSM Evolution (EDGE), 3G, 4G, LTE, WiMax, or other wireless data connection. Similarly, other wireless appliances 28, such as Palm, Samsung, and Motorola smartphones or other portable wireless appliances such an the iPod Touch or Microsoft Zune may be configured to connect to access system 20 through access node 50 to allow a user to access their hotel room.

Alternatively, or additionally, access system 20 utilizes at least one access node 50 to interface with wireless device 24. Access node 50 is a wireless node implementing a short-range wireless standard, such as Bluetooth®, which once paired with, may provide access to the Internet and data network 12 to wireless device 24 via internal network 54, in addition to server 60. Additionally, in a further form, access node 50 preferably broadcasts a wireless signal, implementing a wireless local area network, such as 802.11 a/b/g/n or the like thereby providing Internet connectivity via a traditional wireless network to hotel guests. According to the illustrative embodiment, access node 50 broadcasts information which is linked to the location of the user device over one or both of its short-range wireless signals to wireless device 24.

In the illustrative form, access system 20 includes a plurality of access nodes, such as access node 50, where each node is strategically positioned near a specified structure (i.e. a hotel room). The access nodes are preferably always in a discoverable mode so that wireless devices 24 may be paired with them on demand in the event the wireless device 24 is authorized, such as by having an authorized MAC address. In a further form, the access nodes are not in a discoverable mode and the pairing of the access nodes with wireless device 24 occurs prior to the user's arrival programmatically. Illustratively, in some embodiments, access node 50 is operatively connected to server 60 to process and authenticate electronic unlock requests from wireless devices 24. Firewall 52 includes at least a hardware or software implemented firewall or other selected security features to prevent external access to server 60 or access node 50.

The location information maintained by access node 50 is linked to the present/assigned location of the node and is used in processing any unlock request. For example, an access node on the fourth floor of a hotel in downtown Chicago may be assigned a unique hotel identifier coupled with a hotel zone identifier. Alternatively, the node may be assigned a single identifier which is then linked to its location by the wireless device 24 or server 60.

Access system 20 additionally comprises a mechanical lock 34 for locking and unlocking a structure 40 (partially shown). In the illustrated embodiment, a user gains access to the structure 40 via door 32. In the illustrative embodiment, mechanical lock 34 is a mechanical door lock, which includes a locking mechanism similar to a common entry or exterior lock, but is further capable of self-unlocking in response to an electronic signal. In a further form, the lock 34 includes electronics or circuitry to enable it to periodically receive unlock keys and verify the unlock requests against them when appropriate. In alternate forms the lock 34 may include an existing or traditional lock for securing a door combined with a separate but connected device for performing these functions, such as to enable retrofitting or combination with separate locking devices.

For purposes of non-limiting example, mechanical lock 34 may include a cam lock, rotary latch, electro-mechanical lock, magnetic lock, or the like. According to one preferred form, lock 34 unlocks in response to an electrical signal sent from an access node 50. In an alternate form, the lock 34 unlocks in response to an electronic signal sent from a wireless device 24. In one form, the electrical signal is sent wirelessly, such as over a low-power RF connection, such as a Zigbee® or Bluetooth® connection (including Bluetooth® LE). In a further preferred form, the lock 34 returns to a locked state following the passage of a predetermined time period or a user opening and closing the door following the receipt of an unlock signal. In some additional forms, lock 34 or door 32 may also include a mechanical key slot, key card, or other entry permitting authentication means 36 in addition to, or as backup for, that described herein with respect to lock 34. In addition, it shall be appreciated that system 20 may be applied to access restrictions other than locks including, for example, an elevator control system providing limited access, a garage door, or others access barriers, as described later.

In a further embodiment, the lock 34 can be associated with an access gate or turnstile, where the access gate or turnstile may act in a similar capacity as a door 32, and be used to control access into any restricted area, such as for example, an event venue or public transportation terminal (i.e. subway terminal, bus station, train terminal, or airport gate). Upon receiving the unlock keys and verifying the unlock requests against them then—as appropriate—allows the user access through the turnstile, gate, or other access control mechanism. In this embodiment the unlock keys could be an event ticket, airline ticket, or public transit pass.

According to an exemplary embodiment illustrated by FIG. 1A, server 60 operates to receive unlock requests from access node 50 over internal network 54. In one form, the server 60 serves to authenticate the request or a portion thereof using a reservations and occupancy database, while in other forms, the access node 50 may perform at least a portion of the authentication. In the illustrative embodiment, server 60 processes each request corresponding to an unlock request received by access node 50 from wireless device 24, and upon proper authentication, confirms the granting of the request to access node 50 which then transmits an electronic signal to the corresponding lock, such as lock 34, permitting access to the structure 40. While server 60 is described and illustrated as being a server, it should be understood that server 60 may be any computer, including a client server arrangement. Server 60 may interface with access node 50 by either a wireless or hardwired interconnection. Preferably, the connection is a secured connection. A non-limiting example list of potential interfaces includes IR, optical, RF, serial port, IP network, and US. Additionally, the functions of server 60 and access node 50 may be integrated into one computer system. Further, some or all of the functions of server 60 may be implemented by a remote server or other cloud based configuration.

In one form, access node 50 is fixed at a single position, but in an alternate form, access node 50 may be moveable, such as located within an elevator, and include a floor detector, so that the node may broadcast information linked to the appropriate floor upon which it is currently located. In a further form, an access node 50 is fixed within an elevator and connected to the elevator control system to allow the wireless device to communicate floor authorization information to access node 50. As such, the wireless device 24 may broadcast a floor to which the user is authorized to access so that the user may select that floor. In a further form, the elevator may be automatically commanded to take the user to that floor by access node 50 or server 60. As such, the user is enabled to access the floor or may experience a touchless trip to the proper floor.

In still other embodiments, lock 34 is operably coupled to an override switch (not shown) having an access disable state. Asserting the override switch prevents the access system 20 from permitting access to corresponding structure 40. As one non-limiting example, the override switch may be asserted when a guest engages a deadbolt or bar latch within their hotel room. In some embodiments of the access system 20, the override switch is incorporated into an electronic control, not shown here, accessible to the user within structure 40.

A flowchart illustrating one set of steps performed in configuring a wireless device 24 for use in accessing a structure 40 according to one embodiment of the present invention is shown. The process involves a wireless device 24 and the various other components of access system 20. The following description is with continuing reference to access system 20 of FIG. 1A. As shown in FIG. 1A, the wireless device is cell phone 22; however, it is understood that other networked appliances are also Intended. It shall be appreciated that while the process is described with respect to the reservation and check-in process common for a hotel and hotel room the novel access system could be adapted for application in various settings to provide for the same desired result. As such, the confirmation and check-in process may be replaced with an employee authorization process or the like depending upon the nature of the structure being utilized.

Figure 1B:
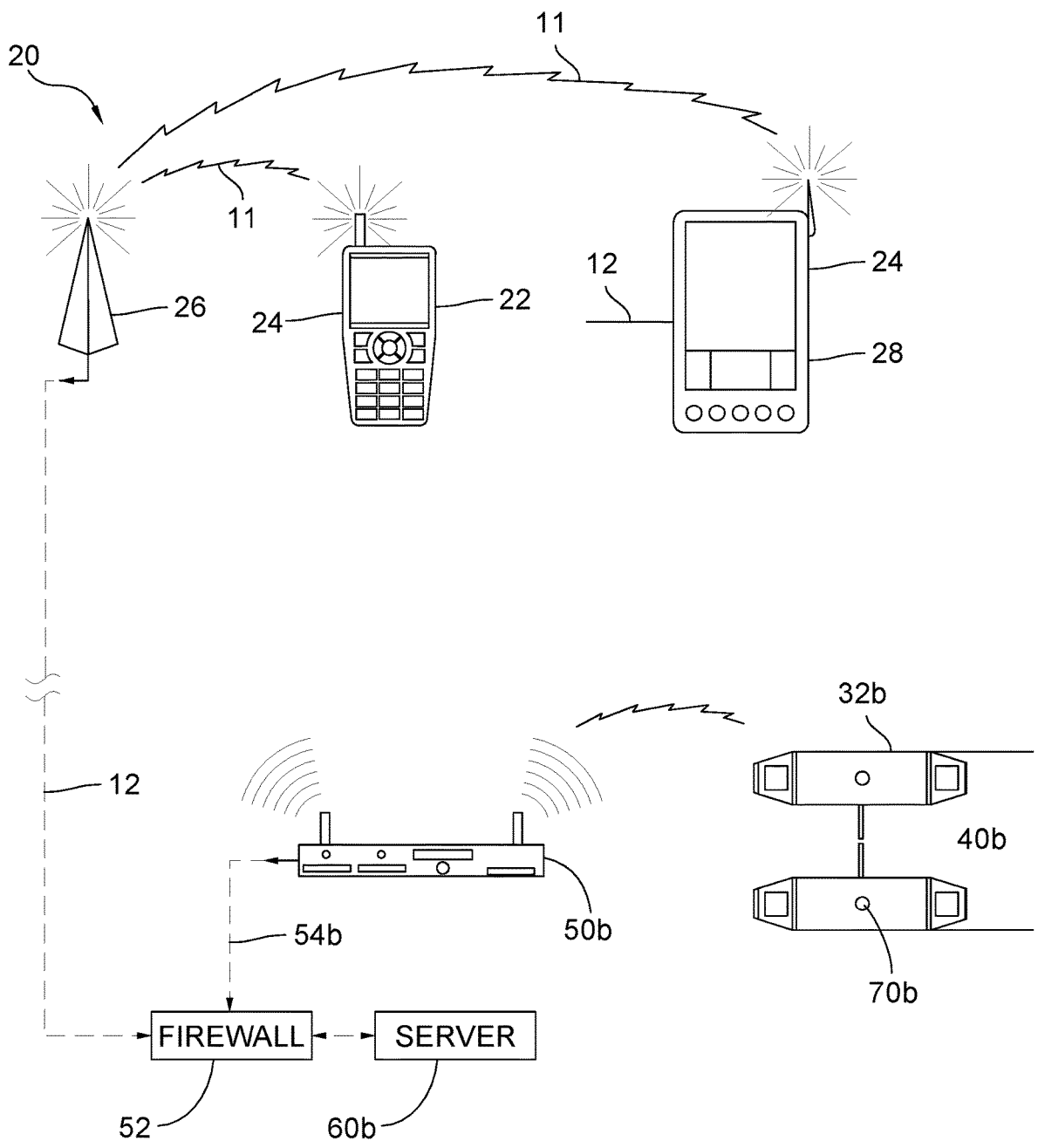
FIG. 1B is a diagrammatic view of an access system according to one implementation of the present invention.

In another embodiment illustrated by FIG. 1B, the door 32 shown in FIG. 1A may be replaced by an access governor 32b, such as a security guard, mechanized gate, authorized airline personnel, turnstile, or other authorized personnel. Similarly, the access governor can be virtual, such as a firewall or database security system that restricts access to a virtual restricted area. Upon receiving the unlock keys and verifying the unlock requests, the access node 50b may provide an electronic signal to an indicator 70b that may notify the access governor 32b when it is appropriate to allow the user access to the restricted area 40b. As shown in FIG. 1B, the indicator 70b may be any form of indication of granting or denying access, including but not limited to, an electrical signal, an audio or visual notification with a light or a buzzer, or a combination of both. Additionally, the indicator 70b may also be capable of providing additional data or another electronic signal to another wireless device, which may be associated with any access governor 32b. The access node 50b gives either (i) an affirmative notification associated with an unlock key, whereupon the access governor 32b permits user access into the structure or restricted area; or (ii) a denial notification whereupon the access governor 32b is instructed to prevent the user from accessing the restricted area 40b. Similarly, the access node 50b may transmit an authentication signal or data to another wireless device in proximity to or otherwise associated with the access governor 32b and may provide the access governor 32b with other data that may be associated with the user's unique identifier.

According to another embodiment Illustrated by FIG. 1B, server 60b operates to receive unlock requests from access node 50b over internal network 54b. In one form, the server 60b serves to authenticate the request or a portion thereof using a database, while in other forms, the access node 50b may perform at least a portion of the authentication. As shown in FIG. 16, server 60b processes each request corresponding to an unlock request received by access node 50b from wireless device 24b, and upon proper authentication, confirms the granting of the request to access node 50b which then transmits an electronic signal to the indicator 70b which then notifies the access governor 32b to permit or not to permit access to the restricted area 40b. While server 60b is described and illustrated as being a server, it should be understood that server 60b may be any computer, including a client server arrangement. Server 60b may interface with access node 50b by either a wireless or hardwired interconnection. Preferably, the connection is a secured connection. A non-limiting example list of potential interfaces includes IR, optical, RF, serial port, IP network, and USB. Additionally, the functions of server 60b and access node 50b may be integrated into one computer system. Further, some or all of the functions of server 60b may be implemented by a remote server or other cloud based configuration.

An optional feature of the embodiment shown in FIG. 1B is the addition of a secondary authenticator. In this option, the secondary authenticator is any suitable device or system that augments the primary access governor to confirm the electronic signal from the access node is appropriately associated with the distinct user. For example, the secondary authenticator may be a motion sensor that, in one example, determines whether the user has passed through the access governor. The secondary authenticator is in electronic communication with the access node. In an additional optional embodiment, the access governor may be in the form of a vestibule having a first gate that allows access into an intermediate check point and a second gate that allows access into the restricted area, wherein the user may be allowed entry past the first gate into an intermediate check point at which point the gate closes behind them to ensure a controlled number of users entry into the intermediate check point, such as a single user at a time. Upon receiving an access request and authorization, the second gate opens allowing the controlled number of user's access into the restricted area. This embodiment provides additional assurance that only users with proper credentials are allowed access into the restricted area.

Similar to the exemplary embodiment show in FIG. 1B, a gate can be understood to be a virtual gate that does not physically impede a user; rather, a gate may also encompass a defined area and has at least one motion sensor. In this exemplary embodiment, a motion sensor may sense the presence of a user and may track their location in a restricted or unrestricted area. Additional motion sensors may be used to track the movements of a user within a restricted or unrestricted area which may provide an additional security function. Upon verifying the unlock key(s), an access node may provide an electronic signal to an indicator that notifies an access governor when it is appropriate to allow the user access to the restricted area. Additionally, a motion sensor can be used to trigger the requirement of a digital impression of the user as they access a restricted area before exiting the gate, such as a biometric scan or photograph. If motion is detected and a digital impression was not recorded an indicator may notify the access governor. This embodiment could be implemented in a number of uses for airline gate access, approval, and entry to and through the jet bridge. Similarly, this embodiment could be used in many service drive-through lanes to sense a user in a car and trigger a charge to their electronic wallet upon sensing the user at a pick-up window. Another application of a motion sensor, is its ability to sense a user approaching a monitor in an airport and then to highlight the user's flight in a predetermined color on the monitor. This may provide the user the ability to quickly identify the gate for their flight without undue searching and time delay.

In another aspect, the access nodes may be capable of detecting multiple users in the access gate and identifying each of the users. Multiple access nodes can be used to determine if the users are entering or exiting a predetermined area. This aspect of the invention could be used for, but not limited to, use in conference room/conference attendance monitoring, crossing a secured border, commercial security for natural disasters or emergencies, and the ability to split checks between different users and the same table.

Figure 1C:
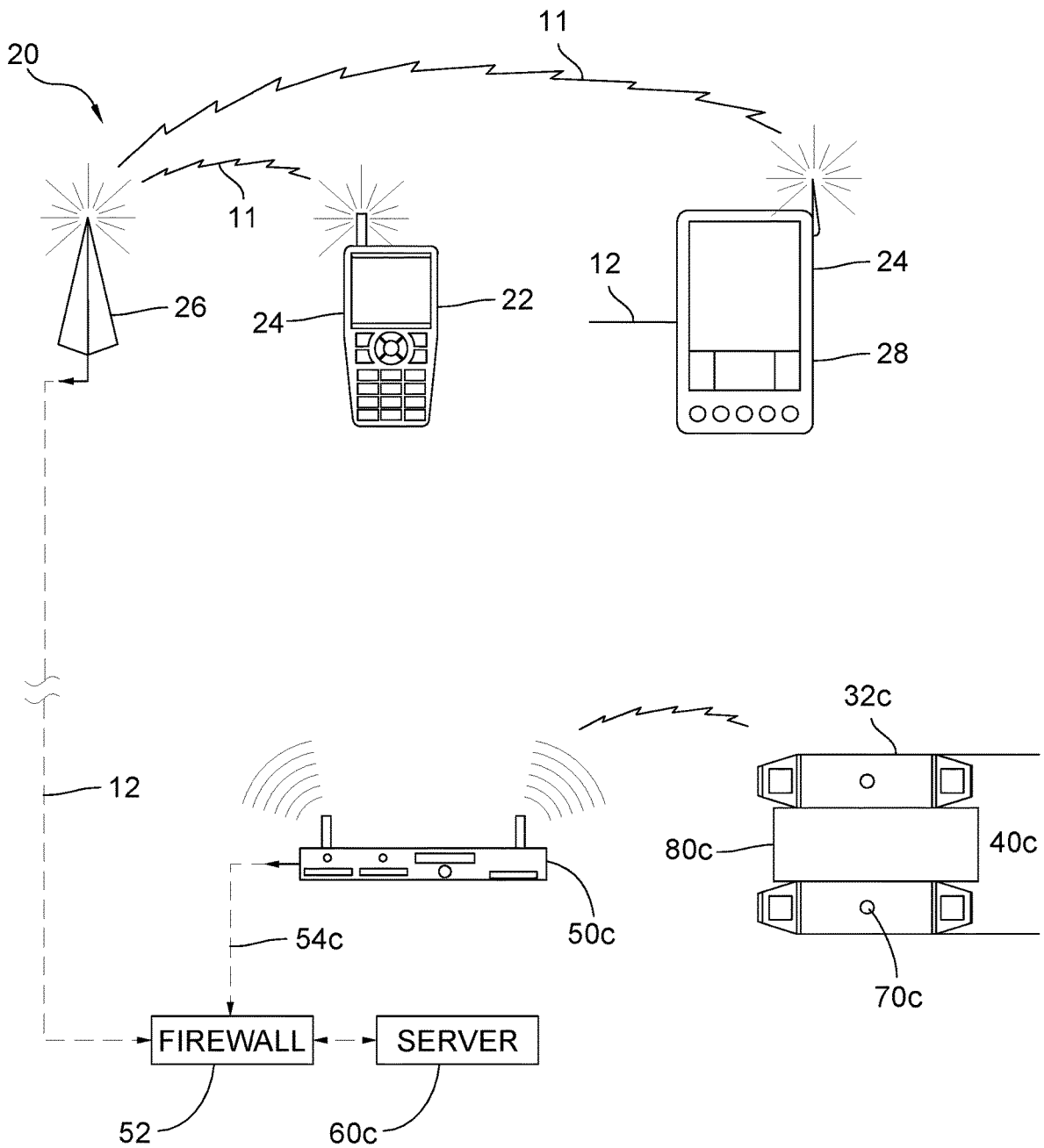
FIG. 1C is a diagrammatic view of an access system according to one implementation of the present invention.

Additionally, as shown in FIG. 1C, a pressure sensitive mat or pad 80c can be placed in proximity to an access gate 32c. The pressure sensitive mat 80c can be communicatively connected through an access node 50c to the internal network 54c and server 60c that is in connection with the access node 50c and access governor 32c. The pressure sensitive mat 80c can have sufficient sensitivity to distinguish individuals within a plurality of people standing on the pressure sensitive mat 80c. Accordingly, the pressure sensitive mat 80c in communication with an access node 50c can distinguish between an authorized user and an unauthorized user or nonuser. Furthermore, to help ensure the distinction between authorized and unauthorized users, the pressure sensitive mat 80c can be communicatively connected to a motion sensor. The ability to distinguish between an authorized user and an unauthorized user can be advantageous in situations where an access governor 32c does not require the isolation of a single user to authenticate their unlock request credentials before granting access into a restricted area 40c. More specifically, this can be applicable in venues that have a large access area that is being monitored by security personnel scanning tickets. Both authorized and unauthorized users can be present on the pressure sensitive mat 80c and approach the access governor 32c simultaneously. The access node 50c in conjunction with the pressure sensitive mat 80c can sense the presence of an authorized user versus an unauthorized user and alert an access governor 32c of an unauthorized user attempting to access the restricted area.

Furthermore, a secondary identifier can be used to further authenticate the authorized user. The secondary identifier can be a biometric sensor or other unique user identifier, such as a PIN. The pressure sensitive mat 80c can also be communicatively coupled to a camera that will trigger a photo or video to be taken when an unauthorized user is attempting to access the restricted area. This pressure sensitive mat 80c can effectively help prevent "piggy-backing" into a restricted area, thus preventing unauthorized users from entering restricted areas with the help, knowingly or unknowingly, of authorized users. Multiple access nodes can be used and communicatively coupled to the pressure sensitive mat 80c to accurately pinpoint and distinguish a user from an unauthorized user.

Additionally, the pressure sensitive mat 80c can be used in point-of-sale ("POS") and secure processing applications. A pressure sensitive mat 80c can sense a user who is in a queue to pay for an item. In one example, a user could pre-order an item and while waiting in line for preparation or packaging, the pressure sensitive mat 80c can track as the user moves in the queue/line. Upon reaching a pre-determined location/checkpoint, such as the register or counter, an access node 50c can trigger an authorization request to initiate payment from the user's virtual wallet for the item. In another embodiment, instead of initiating a payment from a virtual wallet, the access node 50c can trigger a payment demand to a POS system, such as a credit or debit reader, or similar system that requires a user to swipe their card or pay using any other suitable means.

Another example can include an access node 50c detecting when a user enters the store to trigger preparation of the Items or the user's order. A user's movement can be tracked as the user moves along the pressure sensitive mat 80c in connection with the access node 50c. Upon reaching a pre-determined point on the pressure sensitive mat 80c an employee of the store can deliver the user's order and the access node 50c can trigger a debit from the user's virtual wallet. A merchant can then deliver a user's order upon successful payment by the user.

For additional security during payment, a secondary identifier can be used such as a biometric sensor or signature block to acknowledge that the proper user's virtual wallet is being debited. If a user does not have a virtual wallet, the access node will indicate the user's information and order or request to the vendor, requiring the user to pay through a traditional POS system.

Figure 2:
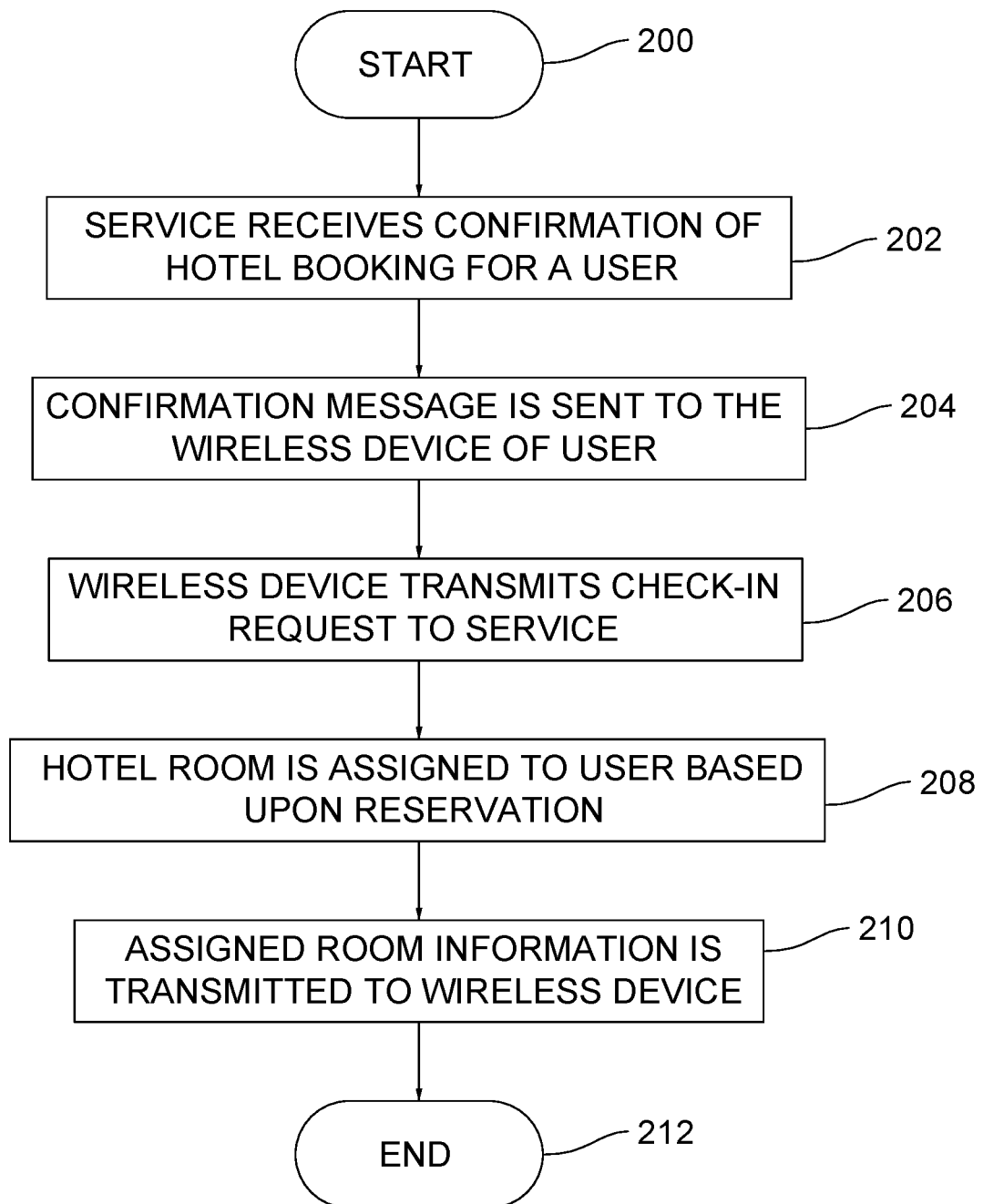
FIG. 2 is a process flow diagram illustrating one set of steps performed in enabling a user to access a structure using a wireless device and the novel access system.

As shown in FIG. 2, the process begins at start point 200 with the novel service receiving confirmation of the booking of a hotel stay for a user (stage 202). The confirmation information preferably identifies the hotel and the user and includes a check-in/check-out date along with details of the type of room requested/reserved. In the preferred form, this confirmation Information is received by server 60 as a result of a hotel booking being made for a user either online, in person, or over the phone.

Subsequent to receiving the confirmation information, a confirmation message is sent to the wireless device 24 of the user (stage 204). Preferably, a phone number or e-mail address corresponding to the user's wireless device is submitted along with the booking information. The confirmation message may be in the form of an e-mail, SMS, text message, push notification or the like, sent over data network 12. The confirmation message Includes a hotel identifier, user identifier, and an access string. In the illustrated embodiment, the confirmation message is handled by an installable application on the user's wireless device 24 which is available for install to the user, such as via the hotel website, a third-party website, other application source, or download source indicated in the confirmation message. Preferably, the application is suitable for operation on various mobile operating systems including Microsoft Mobile, Symbian OS Palm OS, webOS, Mobile Linux, Apple OSX (iPhone® and iPad®), Android and MXI. In other forms, the application used by wireless device 24 may be browser-based and/or embedded software, to name a few non-limiting examples.

As a result of receiving the hotel identifier, the application will be able to retrieve access codes to enable wireless device 24 to automatically pair with access nodes at the appropriate hotel upon arrival. Preferably, those access codes will only be available the day of scheduled arrival or slightly before to prevent unauthorized access during the designated start and ends times of the stay, which are set by the system. In a further form, the pairing may be established automatically prior to the user and device 24 arriving at the hotel. In order to allow the user to access their room, a specific room must be assigned to the user. Traditionally, this has occurred either the day of check-in or during the check-in process. However, in the Illustrative form, the user is assigned a specific room automatically prior to or upon arriving at the hotel. In one form, this occurs as a result of the wireless device 24 associated with the user transmitting a check-in request to wireless node 50 which is then sent to server 60 (stage 206). The check-in request is preferably triggered by the user's wireless device 24 connecting to an access node 50 within the hotel indicated by the hotel identifier of the confirmation message during the timeframe Indicated by the check-in/checkout dates. Alternatively, the check-in request may be transmitted via an electronic kiosk in the hotel lobby, via the user device 24 over data network 12, or an actual in-person check-in entered by a hotel representative. It is preferred that the check-in request be sent over network 54 to server 60. In an alternate form, the check-in request may be sent over the Internet to server 60 without the user being present at the hotel.

Upon receiving a check-in request, access node 50 communicates with server 60 to confirm the dates and access string provided by the wireless device 24 and assign a room matching the reservation of the user (stage 208). In the preferred form, this is accomplished by server 60 which interfaces with the hotel's management system to store the appropriate access credential in an electronic database accessible to server 60. In addition, the server 60 associates a key code matching the user's confirmation message with the assigned room. In an alternate form, step 208 may be omitted and the access system 20 may simply automatically assign a room to the user, as described above with respect to step 208, on the day of check-in absent an indication of the user's presence at the hotel or the like.

The details of the assigned room, including its number and location, are then sent in a return message to the user's wireless device 24 by server 60 via access node 50 (stage 210). This enables the user to send an electronic request for access to the hotel room to access node 50 using wireless device 24. In one form, the MAC address of the wireless device 24 or data based thereon is transmitted along with the request for access, and this MAC address is similarly stored in the electronic database in association with the assigned room. The process ends at end point 212. It shall be appreciated that this process may be modified to accommodate more than one authorized hotel guest per room, such as having two wireless devices authorized to enter the same hotel room, or allowing a current guest to authorize the wireless device of another to access the hotel room for any portion of their remaining stay.

In continuing the description of the embodiment described with respect to FIG. 2, a flowchart illustrating one set of steps performed in allowing a user to access structure 40 using wireless device 24 and the various other components of access system 20 is shown. The following description is with continuing reference to access system 20 of FIG. 1A and the description accompanying FIG. 2.

Figure 3:
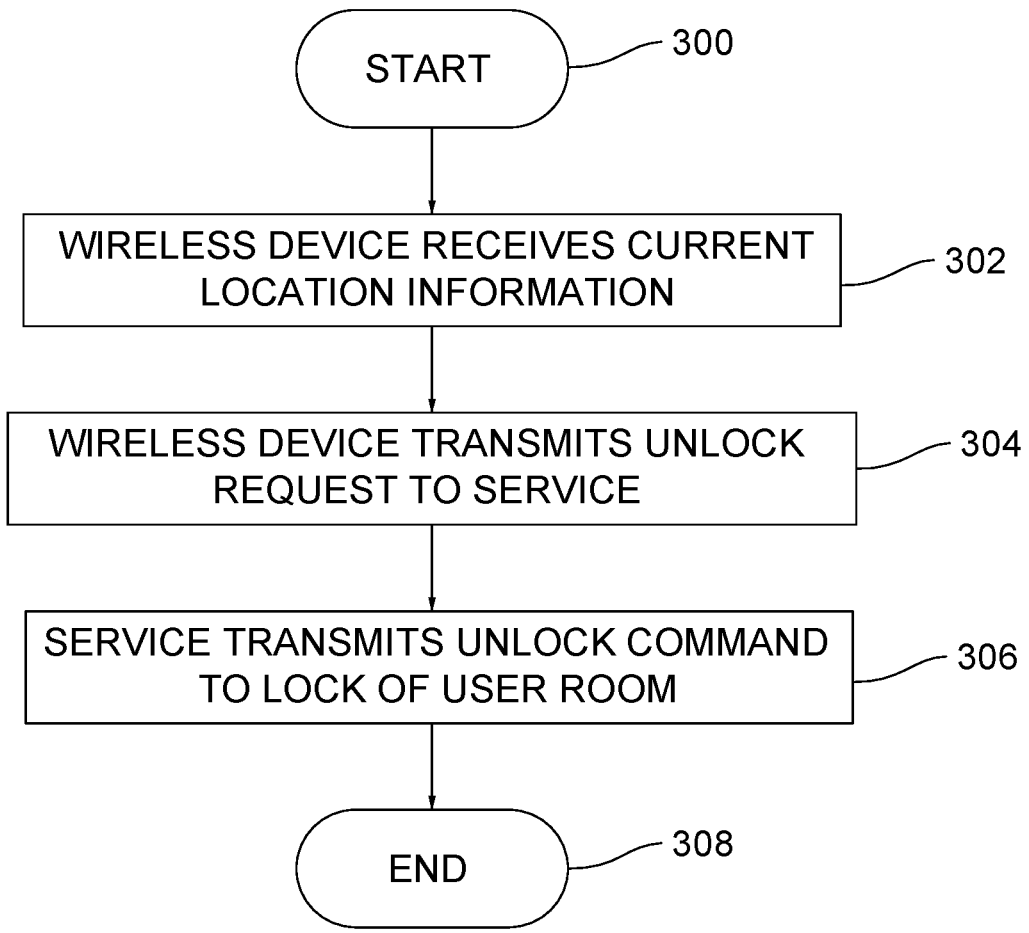
FIG. 3 is a process flow diagram illustrating one set of steps performed in providing access to structure to a user using a wireless device and the novel access system.

As shown in FIG. 3, the process begins at start point 300 with the wireless device 24 receiving location information linked to the current location of the user and wireless device 24 from access node 50 (stage 302). In one form, this location Information is received or determined by wireless device 24 from access node 50 which is located near the user's assigned room (represented by structure 40). In the preferred form, access node 50 broadcasts a hotel identifier and a zone or area identifier which correspond to zones, such as floor, wings, or portions thereof in a hotel. In an alternate form, a unique identifier is sent along with a received unlock request by access node 50 which is then used as a lookup in a location table by wireless device 24 or by server 60. As a result, an added layer of security is provided by server 60 being configured to only authorize requests from access node 50 (which is an access node within range of the door requested to be unlocked) and subsequently authenticating those unlock requests received to confirm that the requesting wireless device 24 is authorized.

Depending upon the application, structure 40 may be within the broadcast range of access node 50, or the node 50 may be only located nearby, such as near the main elevator, stairway, hallway, or other essential entranceway. Once the wireless device 24 is within range of and is connected to access node 50, the wireless device 24 transmits an unlock request, which is received by access node 50 and passed on to server 60 (stage 304). Additionally, the access nodes 50 may be configured to require a predetermined signal strength prior to permitting an unlock request to be issued, to ensure that the user is in close proximity to the door which access is requested for. In the illustrated embodiment, this request is sent through internal network 54, but it shall be appreciated that the message may also be sent through another wireless network, such as 802.11 or another similar technology. The unlock request may include any of the following: hotel ID, room number, location Information, user name, reservation number, check-in/check-out dates. In addition, other Information may be included in the request.

In a still further form, the node 50 approximates the distance between itself and wireless device 24 using a signal strength determination. A zone may then be set (including a distance minimum or min/max range) which defines the distance the user along with wireless device 24 would be from the node 50 when in an acceptable vicinity of their assigned structure 40. If this determined distance does not match that set by the operator, then any unlock request send will not be authorized.

Once an unlock request is received by server 60, server 60 authenticates the MAC address of the wireless device as well as the validity of the current reservation and confirms the request with access node 50. Upon receiving this confirmation, access node 50 transmits an unlock command to the appropriate lock 34 using the Zigbee® or Bluetooth® LE connection (step 306). Upon receiving the unlock request, the lock then unlocks the structure and enables the user operating wireless device 24 to enter. The process ends at end point 308.

Figure 4:
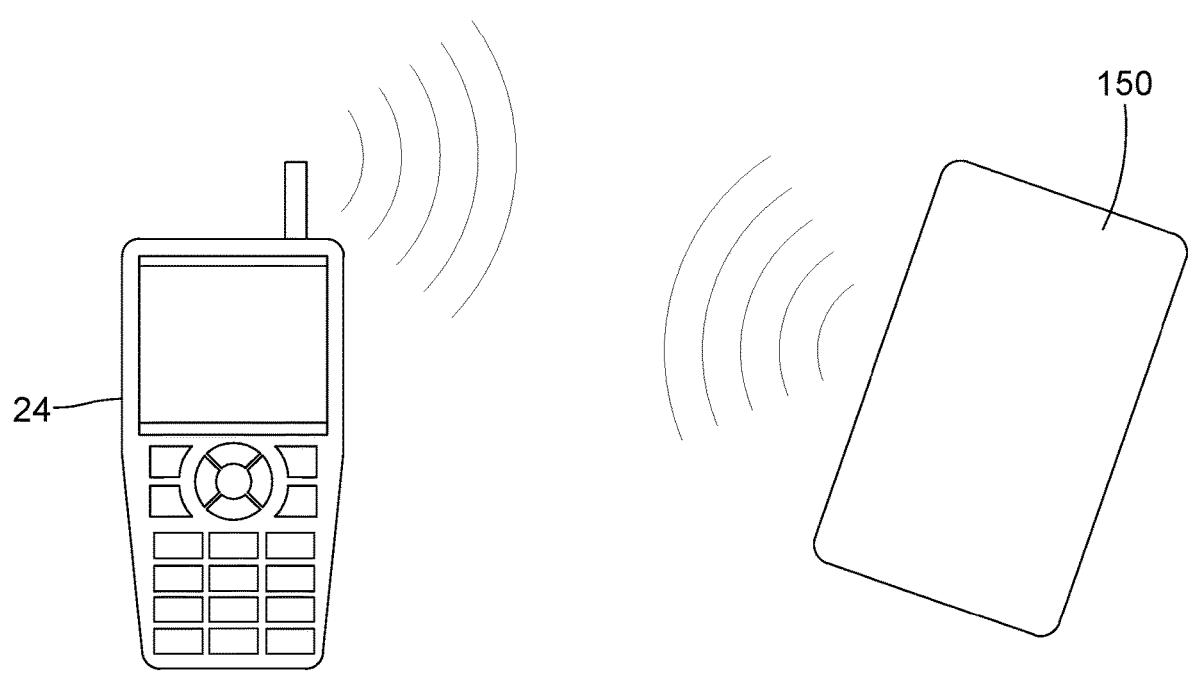
FIG. 4 is a diagrammatic view of a token suitable for use in one embodiment of the present invention.

Turning to FIG. 4, a user node suitable for use in a further embodiment of the present Invention is illustrated. User token 150 is device suitable for being queried by a wireless device 24. Token 150 is optionally provided to the user by the hotel or structure during authorization. Token 150 may include a coded unique identifier or some other verifiable data. Prior to sending any request, such as an unlock request, wireless device 24 may optionally be programmed to query for the presence of token 150 within its presence. In the event that a token 150 having the verifiable data is not found, then the request may be blocked. However, in the event the token 150 is within the proximity of wireless device 24 the request may be transmitted. As such, the user may be required to carry token 150 to ensure that wireless device 24 only functions with access system 20 when in the presence of the authorized user. According to this embodiment, token 150 is a passive Bluetooth node, but may be any other short-range wireless device, such as RFID or the like. Preferably, token 150 does not require its own power source.

Figure 5:
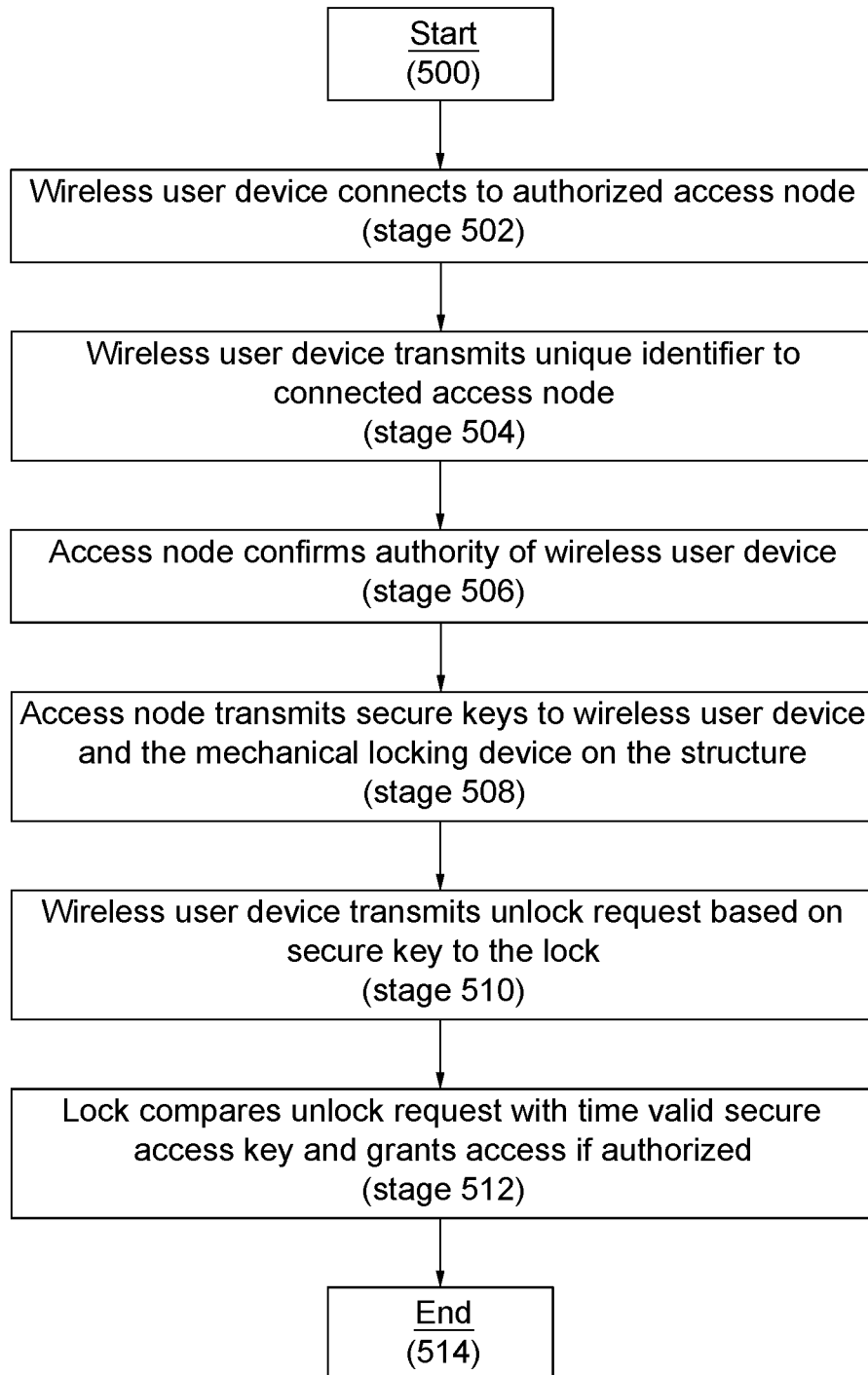
FIG. 5 is a process flow diagram illustrating an alternate set of steps performed in providing access to structure to a user using a wireless device and the novel access system.

In again continuing the description of the embodiment described with respect to FIG. 2, a flowchart illustrating one set of steps performed in an alternative process for allowing a user to access structure 40 using wireless device 24 and the various other components of access system 20 is shown in FIG. 5. The following description is with continuing reference to access system 20 of FIG. 1A and the description accompanying FIG. 2.

Referring to FIG. 5, the process begins at start point 500 with the wireless device 24 connecting to an access node 50 (stage 502). As the wireless device 24 travels throughout a covered area, such as a hotel's grounds and/or interior spaces, it typically comes into contact with one or more access nodes 50. In the event that the access node 50 currently within range of the wireless device 24 is located near the user's assigned room (represented by structure 40) (or alternatively when access node 50 is programmatically authorized to permit access to the user's assigned room) access node 50 and wireless device 24 establish a connection and transmit information there between to confirm that wireless device 24 is authorized to access structure 40 (stage 504). It shall be appreciated that wireless device 24 and other access node(s) 50 may similarly establish a connection, such as for other purposes; however, the remainder of the process below would not be completed. For example, wireless device 24 may automatically connects with a network or wireless nodes 50 for purposes of providing Wi-Fi access within a hotel or other area surrounding the structure 40.

In this embodiment, the information transmitted between the wireless device 24 and the access node 50 in stage 502 is a unique identifier, such as a MAC address, or unique reservation ID which may have been previously provided to the wireless device 24 by server 60. It shall be appreciated that, in the described hotel context, neither the unique identifier utilized herein nor the unique reservation ID described herein has to be the exact reservation number or confirmation number used by the hotel, but only that the identifier selected Identifies a reservation, either directly or indirectly. In one form, this unique reservation ID is provided to the wireless device 24 at or before check-in. It shall be appreciated that in other applications outside of a hotel, the wireless device 24 may provide merely a unique ID, such as a unique key, which identifies the device and/or user given that not all applicable scenarios operate for time limited locations in the way that hotel reservations do. For example in the scenario where the described system is implemented for a secured office, employees and other authorized persons could perpetually utilize unique IDs with no time limitation so long as they remain valid. Further, in the event the described system were used for attending a concert or boarding an airplane, a similar unique ID which may be associated with a concert date/time or boarding date/time, as the case may be, might be utilized.

In a further form, the unique reservation ID may provide to the access node 50 in stage 502 any of the following: unique key ID, hotel ID, room number, location information, user name, password, reservation number, check-in/check-out dates, or some combination thereof. Alternatively, this information may be derived from any information, such as a unique ID and/or encryption key, stored within wireless device 24 for purposes of uniquely Identifying itself to access node 50.

Once the initial transmission occurs, access node 50 utilizes at least a portion of the information (or information derived therefrom) to confirm that wireless device 24 is authorized to access structure 40. As described above, in one embodiment, this request is sent through Internal network 54 to server 60, but it shall be appreciated that the authorization request may also be sent through another wireless network, such as 802.11 or another similar technology.

According to this embodiment, once the authentication request is received by server 60, server 60 authenticates the reservation ID of the wireless device, including the validity of the current reservation and confirms the request with access node 50 (stage 506). Upon receiving this confirmation, access node 50 transmits a secure unlock key to the wireless device 24 which wireless device 24 may utilize to access structure 40 (stage 508). At or about the same time, the access node 50 transmits a matching or associated secure authorization key to the lock 34 of structure 40. In one form, the secure authorization key is transmitted wirelessly, such as by using an RF connection, to lock 34.

In a further form, both the secure unlock key and the secure authorization key provided by access node 50 are time limited in that they remain valid for only a short period of time, such as a day, an hour, thirty minutes, 15 minutes, 5 minutes, one minute, 30 seconds, 15 seconds, 10 seconds, or the like. Further, in this form, the access node 50 periodically transmits new secure unlock keys to wireless device 24 and also periodically transmits new secure authorization keys to lock 34 to replace the expiring keys (stages 508 repeats). In one form, this periodic transmission closely corresponds with the validity period associated with each.

Once a wireless device 24 receives a secure unlock key from access node 50, the wireless device may submit an unlock request to the lock 34 (stage 510). In one form, the unlock request is submitting directly from the wireless device 24 to the lock 34. Such an unlock request may be initiated by the user selecting an option on the wireless interface of wireless device 24. In another form, this may be initiated by the lock 34, such as when the lock 34 senses that a user is within range or when the lock 34 senses a capacitive touch, such as to the door handle. The unlock request may include the transmission of the most recent and the only valid secure unlock key or secure authorization key, or information created as a function of it, between wireless device 24 to lock 34. In one form, wireless device 24 transmits its secure unlock key to lock 34 which utilizes the received secure unlock key or information based on it and its own secure authorization key in order to determine whether the unlock request is authentic. In the event the unlock request is approved, the lock 34 unlocks the structure and enables the user operating wireless device 24 to enter (stage 512). The process ends at end point 514.

In another form, access system 20 additionally comprises a parking access device (not shown) such as a garage door or parking gate coupled to lock control unit 42 selectively permitting access to a parking lot or structure (not shown). In this Illustrated embodiment, a user is able to gain access to the parking area via the garage door or parking gate. According to the preferred form, the parking access device permits a user's vehicle access to the parking area in response to an electrical signal sent from a control device. In one form, the electrical signal is sent wirelessly.

In further systems, a proximity node, similar to node 50, may be included in other areas so as to permit a user to access structures, such as a hotel parking garage, based upon the confirmation information sent to their wireless device or other information as described herein. As such, the user's parking duration could be easily calculated and charged to their hotel bill.

In still further systems, a notification process may be executed by server 60 such that upon detecting a current hotel guest has left the hotel, a request for hospitality and cleaning services may be generated. In one form, the server 60 may detect a hotel guest leaving as a message sent from the user's wireless device upon passing by a access node located near the user's assigned room and another access node at one of the various exits to the hotel. Alternatively, the user opening the exit of the parking garage using their wireless device may trigger such a notification.

In yet another system, the wireless device may transmit information to server 60 upon passing an access node which indicates the user's entrance into the hotel or the area of their assigned hotel room. This information may trigger the in-room temperature to be raised to a user-specified or standard level or it may trigger the lights to be turned on, as described in U.S. patent application Ser. No. 10/126,486 to Sunyich entitled "Personalized Smart Room", which is hereby incorporated by reference to the extent not inconsistent. Similarly, the wireless device may transmit information to server 60 upon passing an access node 50 which indicates the user's access into or out of a restricted area. This information may trigger a fee or charge to an electronic wallet, such as for example Google Wallet or Apple Pay, prior to sending the unlock request to an access node 50.

Figure 6A:
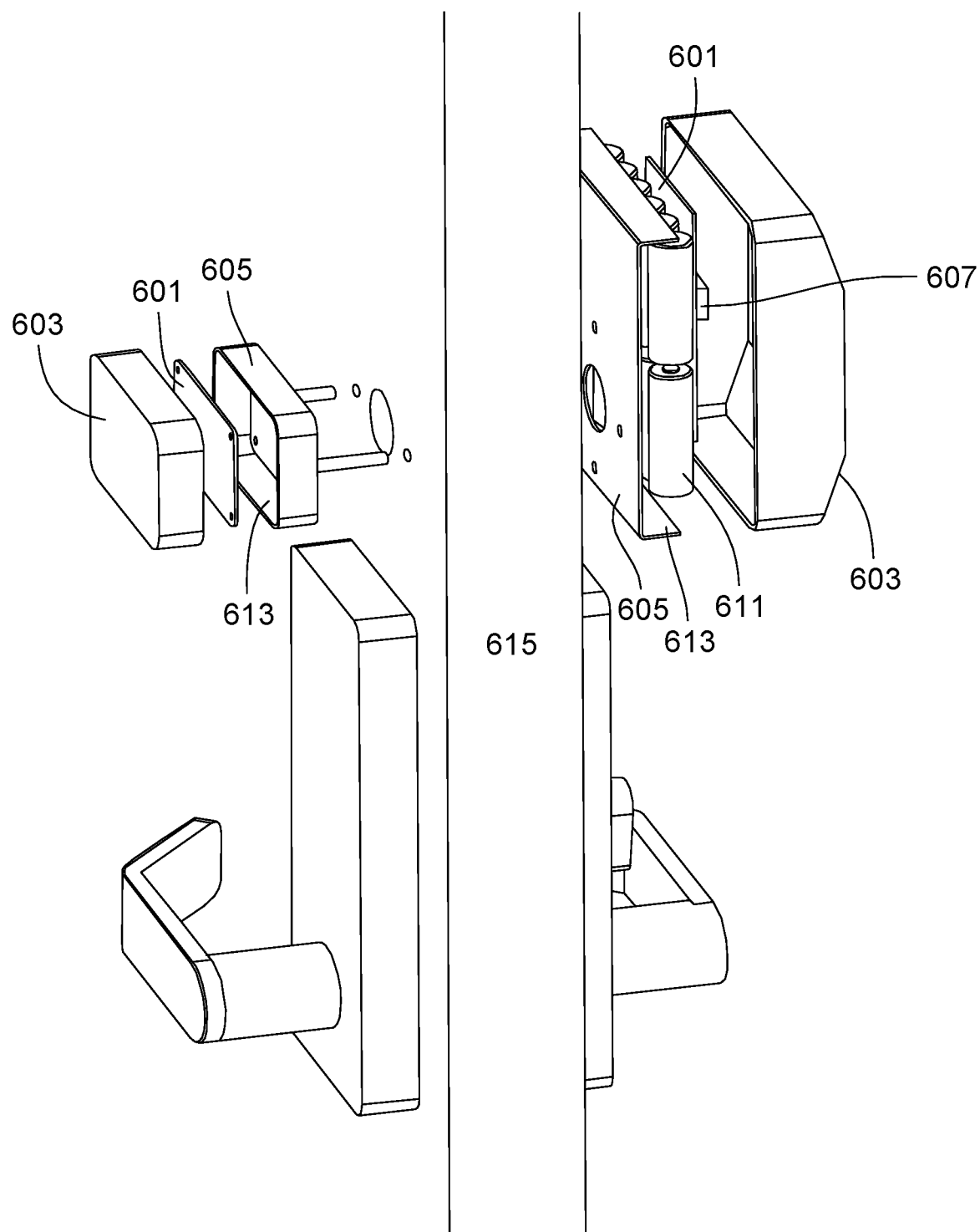
FIG. 6A is a perspective view of an exemplary embodiment of a radio frequency patch antenna enclosure.
Figure 6B:
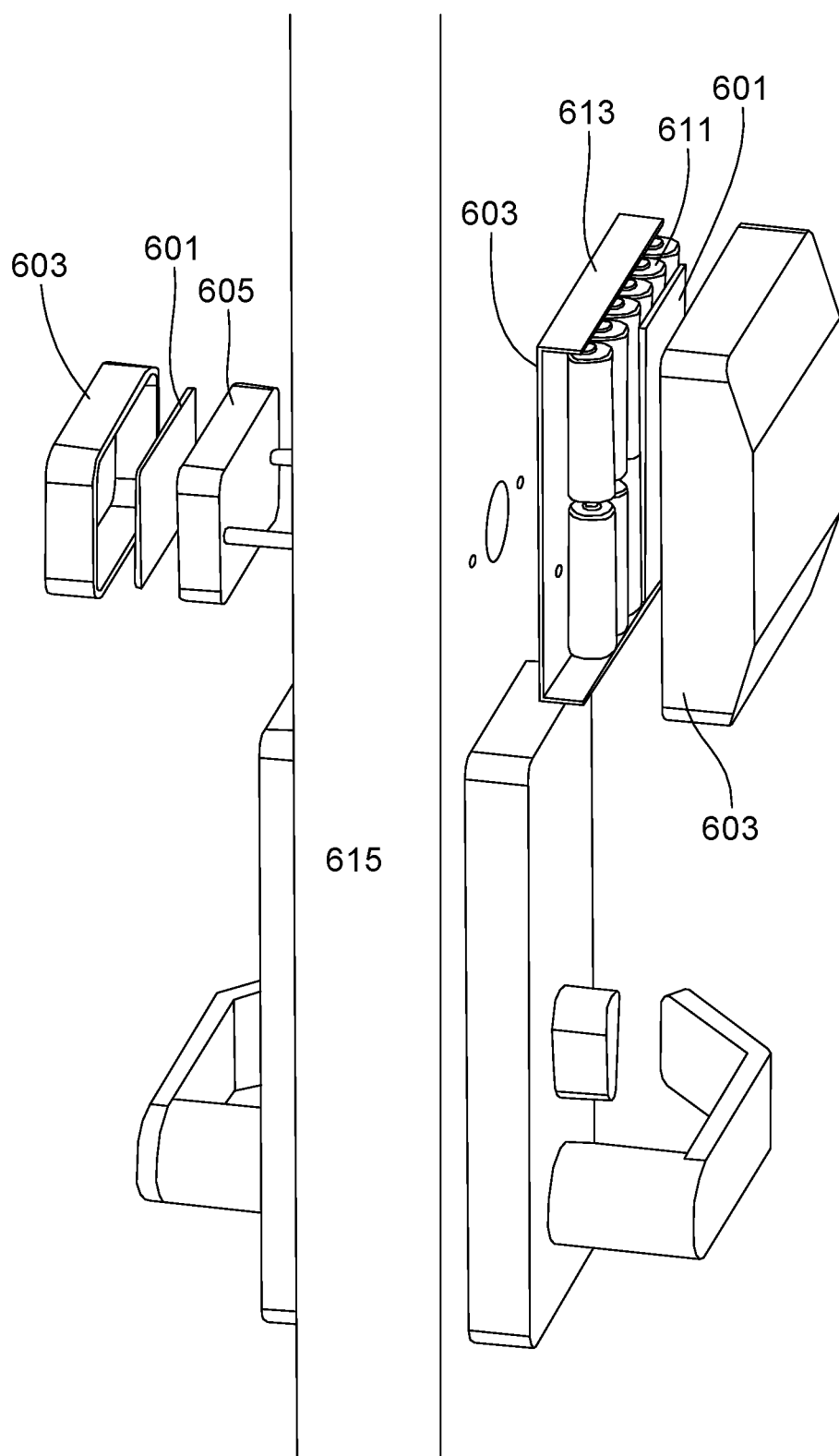
FIG. 6B is a perspective view of an exemplary embodiment of a radio frequency patch antenna enclosure.

Referring to FIGS. 6A-B, an access node 650 can be comprised of at least one antenna 601, such as a printed-circuit-board (PCB) patch antenna. The antenna can be housed in an enclosure that is configured to shape the emitted radiation or short-range wireless radio signals emitted by the antenna 601. The shaping of the emitted radiation or signals can help reduce the back lobe signal strength of the antenna while minimizing the reduction of the bandwidth of the signal, which allows for greater signal coverage in front of the antenna. The wireless communication signal used can be any suitable signal, including but not limited to WiFi, Bluetooth, ZigBee, or NFC signals. The enclosure may comprise a cover plate 603 and a backing plate 605, and optionally further houses the antenna 601 that can be communicatively coupled to a light source 607. In one exemplary embodiment, the housing can further comprise a power source tray for housing a power source 611, such as a battery or a plurality of batteries. In one exemplary embodiment, the backing plate 605 can act as the power source tray. Similarly, a power source can be hard wired to the necessary components of the access node to ensure that power is consistently applied to the access node. The backing plate can have a lip 613 extending outward from the peripheral edge of the backing plate 605. The backing plate can be coupled to an access governor 615.

Figure 7A:
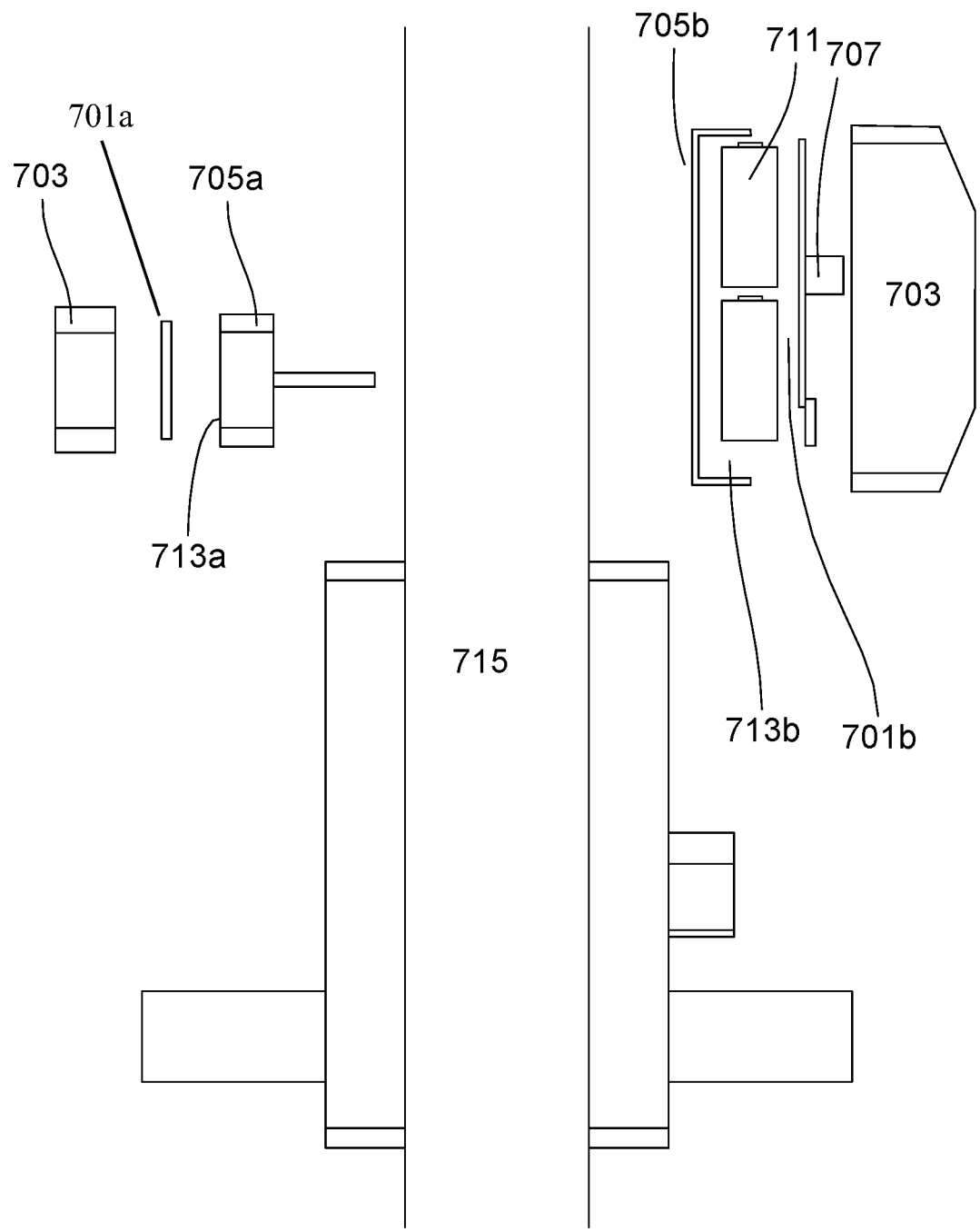
FIG. 7A is a perspective view of an exemplary embodiment of an access node in an application having a door.
Figure 7B:
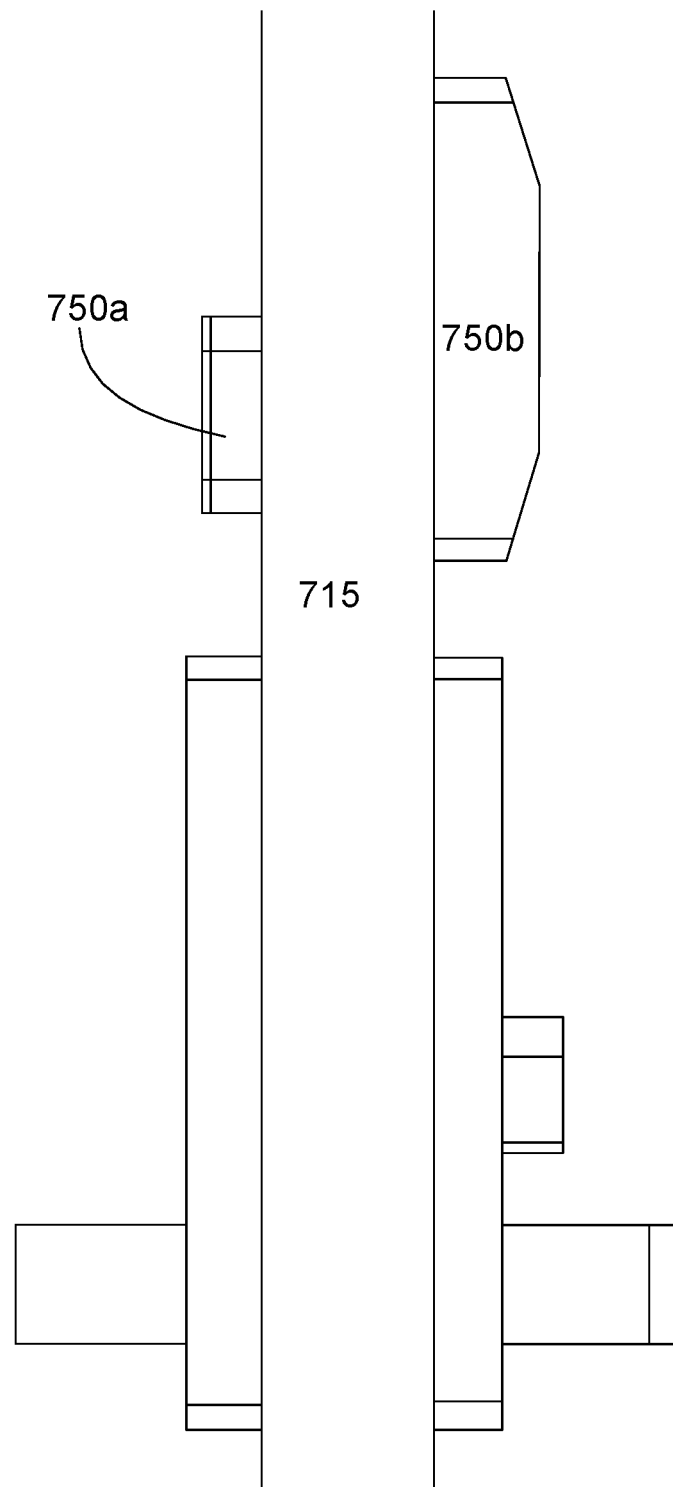
FIG. 7B is a perspective view of an exemplary embodiment of an access node in an application having a door.

As shown in FIG. 7A-B, in one exemplary embodiment, the access system and access node 750a,b can be comprised of two enclosures on opposite sides of an access governor of a structure 715, such as a door. The two access nodes 750a,b can be oriented in a manner where the directionality of the antennas within each access node 750a,b are facing opposite of one another. Both backing plates 705a,b of the housings can have a lip 713 formed and configured in a way to shape the radiation or wireless radio signals emitted from the antenna, thus preventing or minimizing the back lobe radiation from the antenna 701 in the adjacent enclosure. In one exemplary embodiment the lip 713a,b can be formed around the peripheral edge of the backing plate 705a,b. The lip 713a,b can extend a pre-determined distance perpendicularly outward from the backing plate. Alternatively, the lip 713a can extend in any suitable angle outward from the peripheral edge of the backing plate, such as about 15° to about 165°, about 30° to about 150°, 45° to about 135°, or about 60° to about 120°. In one exemplary embodiment, the backing plate 705a,b of the housing can have a lip 713b formed only on the top and bottom edge of the backing plate 705. In the aforementioned embodiment, each backing plate is positioned in a manner where the lip 713 of each backing plate 705a,b is extending away from the lip 713 of the other backing plate 705a,b, in order to shape the signal and radiation away from the other backing plate 705a,b and antenna 701.

The two housings can be communicatively coupled to one another and can share a power source 711. In one exemplary embodiment where the two housings are separated by a door 715, but can be coupled to each other through the door using any suitable fastener, such as a screw or bolt. The backing plate 705 and cover plate 703 can be removeably coupled to each other by any suitable means. Similarly, the backing plate 705a,b can have coupling points for the internal components within said housing, such as the antenna 701, light source 707, and power source tray. Both housings can have a light source that can be visible from the outside of the housing.

The backing plates 705a,b of the housings are configured to block or minimize any RF back lobe signal strength from leaking to the opposite side of the door/structure 715. This can be aided by constructing the backing plates 705a,b of non-magnetic, RF blocking material. The backing plate can have the non-magnetic, RF blocking material in strategic locations, such as the back surface of the backing plate and the shaped lip 713a,b around the edge of the backing plate, to better shape the emitted radiation pattern. The two backing plates 705a,b can be spaced a pre-determined distance apart from each other. In one embodiment this distance apart can be the width of a door, or about 1" to about 2" apart. The farther apart from each other the backing plates 705a,b are, the more likely access node 750a,b is able to determine if a user is on the inside or outside of a restricted area or which side of a door the user is located.

One exemplary embodiment of the housings can be located on the exterior surface of a door, the RF blocking material can be made with any suitable material, such as aluminum, and can be in the form of a rectangular backing plate 705a, such as about 2" by about 3", with about a 0.59" lip 713a around it. In one embodiment, the antennas 701a,b can be printed onto circuit boards using FR-4 material at about 0.059" thickness. The backsides of the antennas can be copper and can be used as ground planes. The enclosure and antenna 701b that face inside of the restricted area can utilize another rectangular aluminum backing plate 705b with dimensions about 3.67" by about 5" and a lip 713b that is about 1" in depth on the top and bottom only. The backing plates 705a,b, along with the separation of antennas 701a,b by the width of the door 715, create a distinction between the desired signal and the back lobe of the undesired signal. The desired signal being the inside signal when a person is on the inside of the restricted area and the outside signal when a person is on the outside of the restricted area.

The antenna 701a,b can interact with the backing plate 705a,b of the housing and can emit a RF radiation field in about 180° in relation to the plane of the antenna 701a,b. In alternative embodiments depending upon the shape of the lip 713a,b, the antenna can emit a RF radiation field between about 15° to about 165°, about 30° to about 150°, 45° to about 135°, 60° to about 120°, or about 90° with respect to the plane of the antenna 701.

The present invention reduces the back lobes signal strength of both antennas 701a,b, which improves the ability to differentiate a user's position relative to an access governor, such as a door 715. The present invention reduces the probability of false readings in the near field area. This is necessary when a user is inside of a restricted area and the signal strength of the antenna 701a facing outside is stronger than the antenna 701b facing inside. The backing plates 705a,b shape the radiation pattern of the emitted radio waves, especially those from the antenna's 701 back lobes. The access node 750 or a plurality of access nodes having the RF shaping properties can be used independently from or in conjunction with the above access governing system embodiments of the present disclosure.

Similarly, an exemplary embodiment of an access system shown in FIG. 8 can include access system 820 may utilize a wireless network, such as a cellular phone network 811 and data network 812 to interface with a wireless device 824, such as cell phone 822. Cellular phone network 811 may comprise a variety of communication networks, including without limitation the universal mobile telecommunications system (UMTS), global system for mobile communication (GSM), and a code division of multiple access (CDMA) network, or similar technology. Cellular phone network 811 may utilize cell tower 826 to establish a wireless bi-directional transmission link between data network 812 and cell phone 822 or user device 824, which may comprise a wireless data link, such as the Evolution-Data Optimized (EVDO), Enhanced Data rates for GSM Evolution (EDGE), 36G, 4G, LTE, WiMax, or other wireless data connection. Similarly, other wireless appliances 828, such as cellular phone, tablet, or token may be configured to connect to access system 820 through access node 850 to allow a user to access a restricted area, both physically and virtually. The system 820 of the present disclosure may also use an internal wireless local network to establish a wireless transmission link between the data network 812 and a user device 824. The wireless local network can be any suitable network standard, such as 802.11 a/b/g/n or the like thereby providing Internet connectivity via a traditional wireless network to third parties and users. Additionally, the access system can be used to determine the presence of a user and track a user's movements using one or more access nodes.

Alternatively, or additionally, access system 820 utilizes at least one access node 850 to interface with wireless device 824. Access node 850 is a wireless node implementing a short-range wireless standard, such as Bluetooth® or NFC, which once paired with, may provide access to the Internet and data network 812 to wireless device 824 via internal network 854, in addition to server 860. Additionally, in a further form, access node 850 preferably broadcasts a wireless signal, implementing a wireless local area network, such as 802.11 a/b/g/n or the like thereby providing Internet connectivity via a traditional wireless network to a user. According to the illustrative embodiment, access node 850 broadcasts information which is linked to the location of the user device over one or both of its short-range wireless signals to wireless device 824.

In an exemplary embodiment, an access system 820 can include a plurality of access nodes 850, where each node may be strategically positioned near a specified structure (i.e. a hotel room, conference room table, retail checkout counter, access gates for airlines or public transportation, healthcare facilities). The access nodes are preferably always in a discoverable mode so that wireless devices 824 may be paired with them on demand in the event the wireless device 824 is authorized, such as by having an authorized MAC address. In a further form, the access nodes 850 are not in a discoverable mode and the pairing of the access nodes 850 with wireless device 824 occurs prior to the user's arrival programmatically. Illustratively, in some embodiments, access node 850 is operatively connected to server 860 to process and authenticate electronic unlock requests from wireless devices 824. Firewall 852 includes at least a hardware or software implemented firewall or other selected security features to prevent external access to server 860 or access node 850. The system can use additional sensors, such as motion or proximity sensors, to initiate the discoverable mode.

In one exemplary embodiment, a healthcare facility or hospital can have a plurality of access nodes 850 located throughout a structure or area. A user/patient can have a wireless device 824, such as a token or RFID wrist band that can actively or passively communicated with the one or more access nodes 850 in the facility. When a user is transported into a particular area, and passes by an access node 850, the user's information stored on the server 860 or other memory can be transmitted to a third party device, such as a display or computer 821. This can include displaying medical records and information (i.e. previous blood pressure measurements, temperature, and allergy information) so prompt care can be given by the medical staff. Similarly, this same type of information can be used for other purposes, such as food allergies and food intolerance in various other settings, such as restaurant and grocery settings. A user could designate certain allergies and intolerances, and prior to purchase, this information can be cross-referenced to ensure a user is alerted to any products that may contain flagged food components. The system 820 could then send a notification to a user device 824 to alert a user of such flagged foods.

The location information maintained by access node 850 may be linked to the present/assigned location of the node 850 and is used in processing any unlock request. For example, an access node 850 located in an aisle of a grocery store or table at restaurant may be assigned a unique store identifier coupled with a product or table zone identifier. These identifiers can be stored in databases connected to the server 860. Alternatively, the node 850 may be assigned a single identifier which is then linked to its location by the wireless device 824 or server 860.

Figure 8A:
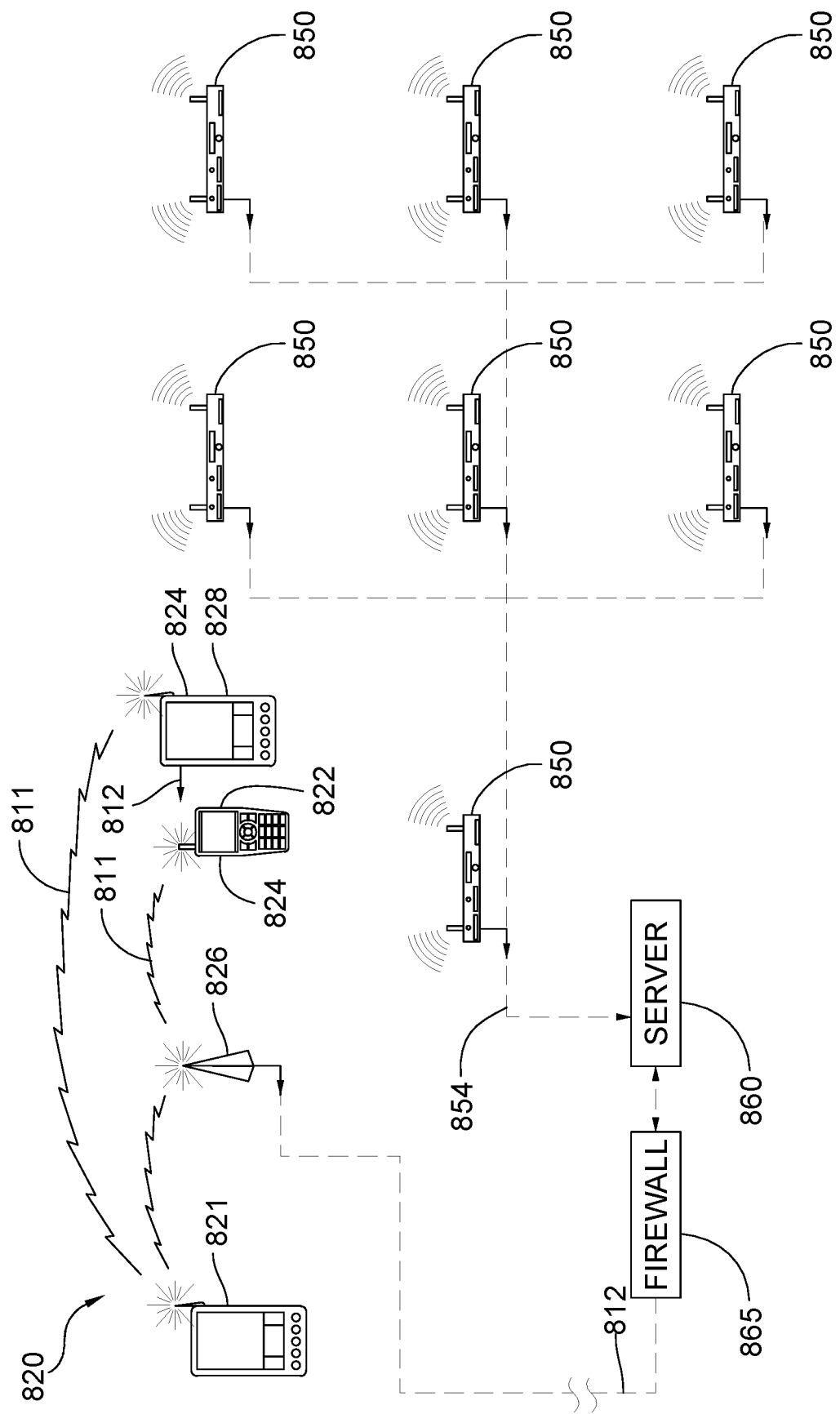
FIG. 8A is a perspective view of an exemplary embodiment of the present invention having multiple access nodes within or defining an area.
Figure 8B:
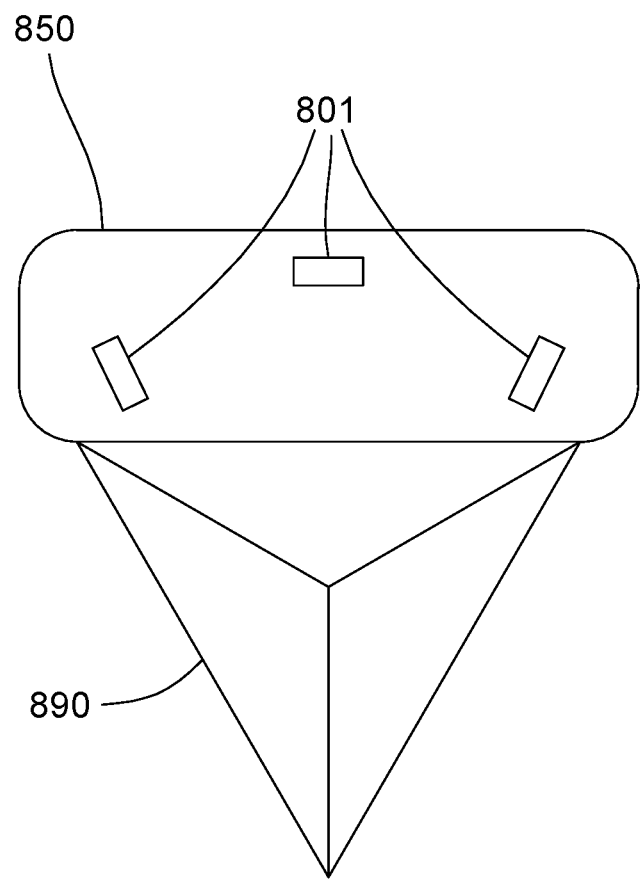
FIG. 8B is an illustration of an exemplary embodiment of an access node for creating a detection zone.

As previously mentioned, the access nodes may be capable of detecting multiple users in a defined area or proximate to one or more access nodes, and identify each of the users. The access node(s) can include a configuration to define a particular detection area. Multiple access nodes 850 can be used to determine if the users are entering or exiting an area or detection zone. In one exemplary embodiment, the area can be predetermined. In one exemplary embodiment, as shown in FIG. 8B, an access node can generate a detection zone 890. The detection zone can be generated using one or more RF antennas 801. In some embodiments, the detection zone can be three dimensional in nature. Similar, to the enclosure shown in FIGS. 6-7, the access node can further comprise an enclosure with a backing plate that can further aid in defining the detection zone 890. In some application of the system 820, a detection zone 890 can be shaped in a manner to prevent or limit the amount of users detected. For instance, at a pay counter in a grocery store or fast food restaurant where there is a queue in order to ensure the appropriate user is being charge, the detection 890 can be configured in a manner to only provided an minimum area/detection 890. Similarly, the system 820 can be configured only allow access to a single user device. In other applications, the access system 820 can access a plurality of user devices simultaneously.

Furthermore, a plurality of access nodes 850 can be used to within a predetermined area. This aspect of the invention could be used for, but not limited to, use in conference room/conference attendance monitoring, monitoring and tracking the location of a wireless device or user within a predetermined area, crossing a secured border, detecting a user/wireless device for point-of-sale transactions, commercial security for natural disasters or emergencies, and the ability to split checks between different users at the same table. This can also be used to further monitor or track a user device 824 within a defined area or a user's proximity to a particular access node 850. This can be applicable for a drive thru or restaurant queue line to monitor the user's movement through the line and when the user reaches a checkout point.

Additionally, the system 820 is capable of providing additionally alerts or messaging to a third party device or access governor upon a user's access to a defined or restricted area. An access governor can be a physical governor, such as an individual, locking mechanism, turnstile, or alternatively, an access governor can additionally include a firewall to restrict access to a server or third party device. The restricted area can be a physical areas, such as a structure or predetermined area, or alternatively can be a virtual restricted area, such as a database, server, third party device, etc. These virtually restricted areas can be further protected using a firewall or other security measures. Notifications can be pre-determined depending upon the desired application of the system by using algorithms with the server or database. Similarly, the notifications can be directly related to each defined user or the defined area a user will be accessing, such as loyalty rewards points that can be accrued upon detection of a user at one or more locations. Similarly, if the user further carries out a transaction, the system 820 can generate additional loyalty points that can be assigned to the specific user/user ID.

In one exemplary embodiment, a plurality of access nodes 850 can be placed throughout a pre-determined area. Similarly, the plurality of access nodes 850 can also be used to define an area. As shown in FIGS. 8A-B, the plurality of access nodes 850 can be used to determine a user's movements throughout a defined area. Throughout the defined area additional access nodes 850 can be strategically placed to determine the location of a user within a defined area with a higher degree of precision, as well as, track the movement of a user. The access nodes 850 can have a backing plate that better direct or shape an RF field generated by the access nodes 850 to aid in distinguishing the location of a user device 824 with respect to a one or more access nodes 850. In one embodiment, two access nodes 850 can be placed back to back with backing plates shaping each of the respective RF fields away from the other. This can allow the system to determine which side a user is located with respect to the access nodes 850, especially if there is a physical barrier separating two defined areas, such as an aisle. One purpose for using the plurality of access nodes with backing plates is to better determine with greater precision a user's location relatively within a defined area, such as if the user is within the defined area or outside the defined area. Higher precision is desired in instances, such as an entrance or exit of a defined area to determine whether a user is inside or outside the defined area. In one exemplary embodiment, a plurality of access nodes can be communicatively coupled to aid in determining the location of a user within the defined area.

In another application, the defined or restricted area by the access node(s) 850 can be moveable within space. For example, a piece of equipment or machinery can include one or more access nodes 850. Upon detecting a wireless device 824, the access node 850 can communicate with the server 860 through the data network 812 to Initiate a program for the machine. This application could be applied to various manufacturing facilities, such as automobile manufacturing. The wireless devices 824 can be coupled to a car body and upon coming into proximity of an access node 850 coupled to a particular machine, the machine can carry out a protocol, such as welding or fastening a part to the auto body. Similarly, the restricted area or defined area can be defined by one or more access nodes 850, which can be coupled to a moveable object such as an automobile or airplane. In these application, the defined area is moveable in space. The server can store different or the same requests depending upon the restricted areas/defined areas location. For instance, an autonomous car travelling between state lines may require additional information depending upon state laws, such as identification requirements or age restrictions.

For example, a plurality of access nodes can be placed throughout a predetermined location or area. Each access nodes 850 can create secondary defined areas, locations, or zones within the initial defined area, such as aisles or rows within a store. Similarly, the plurality of access nodes 850 can be communicatively connected and used to determine the location and/or direction of travel a user device 824 within a defined area having a plurality of access nodes 850. In one exemplary embodiment, the rows can be better defined using the aforementioned example having two access nodes with backing plates back to back. Using the backing plate, an access node 850 can determine which side of an aisle or row a user is located. The access node can be communicatively coupled to a data network 812. A user device 824 can also be communicatively coupled to said data network 812. A user can be sent notifications based upon the user's location as determined by the access node 850. The data network 812 can relate a certain item or product that is proximate to each access node 850 and send notifications based upon the user's position related to the specific access node 850. Similarly, as a user walks by an access node 850, data can be relayed to the data network 812 and stored for data analytics purposes. The access nodes can be tied to a specific product or type of products or to a location of the defined area. Similarly, once a user has been detected by an access node 850, a notification or message can be sent to the user's device 824. The notification or message can be directed to a specific product or item directly associated to the access node 850. This can also be applied to queues for fast food drive-through or lines to determine a user's position in the queue. In one exemplary embodiment, when an access nodes 850 detects the presence of a user device 824 in the queue, the system 820 can access the data network 812 and access one or more servers 860, which can interface with a third party management system/device 821 to store appropriate user information in an electronic database for permission, which may include Identifying a user device 824. Additionally, the database can store additional user information specific to the individual user/user device 824. This information may include previous purchase history, rewards points, saved orders, among other information. Similarly, the third party device/system 821 can be communicatively connected to a server or alternatively have internal memory, wherein the memory or server can access one or more databases having user information.

Alternatively, the system 820 can be used to determine whether a user device 824 is still located within a defined area. In a room application, this can be used by hotel guest services to know when a room is unoccupied to conduct their cleaning or room services. The access node(s) 850 can determine whether a user device is still inside a defined area or if they have left the defined area. This is beneficial in instances for hospitality services to know when a room is available to be serviced. Similarly, a user could use the user device 824 to send a notification to the access node 850 when he leaves the pre-determined area. Additionally, when an access nodes 851 senses a user device 824 inside a room, the system 820 can allow a third party device/system 821 to send a notification or message to the user device 824.

The directionality of RF signals provided by the access node 850 and its enclosure/backing plate described above, is able to detect when a user device 824 enters or exits a defined area. In one exemplary embodiment, an access node 850 is able to detect a user device 824, such as a housekeeping employee, as they are approaching a particular access node 850. The access node 850 can further distinguish if the use of the user device 824 is inside or outside the defined area. When a plurality of access nodes 850 are communicatively coupled to each other, the system 820 can track the user device 824 as it approaches and passes each access node 850. This can be used to track a user's location as they pass each access node 850, as well as determine whether a user is inside or outside a defined area. As previously mentioned, this can be applied to housekeeping professionals and hospitality industries to track the turnaround time of employees as they clean rooms and also monitor what rooms they are currently accessing. Additionally, it can be used to predict housekeeping schedules and allows a user to accept or reject a housekeeping visit through the messages or notifications sent to the user device 824. The server 860 can be used to alert a when a hospitality employee is approaching their room or anticipate the time before the employee or hospitality provider will take before arriving to conduct housekeeping services. The server can then trigger an alert or notification that can provide the third party user the option to accept or decline hospitality services.

Similarly, an exemplary embodiment of the present invention could be used for customer service purposes. A user having a user device 824 within a defined space may need assistance and can denote such need through their device 824. The access node 850 can then determine the user's location and assign a task to the nearest available agent or employee to locate the user in order to provide assistance. Similarly, employees or agents can have their own wireless device 824 that can be used to track the location within the defined area. Users within the defined area can then use a similar process in located an agent or employee through the data network 812 via the access node 850 denoting where the employee or agent is located. The data can be displayed on a user device 824 so they can seek out the nearest agent or employee.

Additionally, the system can be used in queue lines for food delivery or other services that typically require a queue. This can include drive through ordering as well as in store purchases. In one embodiment a user could place an order prior to arriving to the store. Upon entry into the store the user's device 824 could be detected by an access node 850. The data network 812 could be notified and place the user in a queue. Similarly, one or more access nodes could detect the presence of a user at a predetermined access node 850 to trigger preparation of the items or the user's order. Multiple access nodes 850 could be used to determine where in the queue or line the user is located to ensure the proper order is ready when the user is ready to pick up their order. The system 820 can then be used in point-of-sale ("POS") and secure processing applications when the order is picked up. In one example, a user could pre-order an item and while waiting in line for preparation or packaging, one or more access nodes 850 can track the user movement in the queue/line. Upon reaching a pre-determined location/checkpoint, which may be a pre-designated access node 850, the access node 850 can trigger an authorization request to initiate payment from the user's virtual wallet for the item. In another embodiment, Instead of initiating a payment from a virtual wallet, the access node 850 can trigger a payment demand to a POS system, such as a credit or debit reader, or similar system that requires a user to swipe their card or pay using any other suitable means. For additional security during payment, a secondary identifier can be used such as a biometric sensor or signature block to acknowledge that the proper user's virtual wallet is being debited. If a user does not have a virtual wallet, the access node may indicate the user's information and order or request to the vendor, requiring the user to pay through a traditional POS system on a third party device 821.

In one exemplary embodiment, the system 820 allowing a user to access a defined area using a wireless user device 824, the access system comprising a database storing access permissions identifying at least one wireless user device 824 within said defined area and at least one access node 850 within or proximate to said defined area. At least one access node 850, can be positioned near or within the defined area, comprising an antenna configured to emit a short-range wireless radio for connecting to the wireless user device 824. Similar to the access node in FIGS. 6-7, a power source 611 can be communicatively coupled to an antenna 601, and at least one enclosure comprising a backing plate 605 have a peripheral edge and a cover plate 603, wherein said enclosure houses an antenna 601 and said power source 611, wherein a cover plate 603 is configured to couple to a backing plate 605 and enclose an antenna 601 and power source 611. A server 860 can be operated to receive a request associated with a wireless user device 824 and an access node 850 and transmit a response action to the access node 850 or a third party device upon receiving a request using the database associated with the server 860. The server 860 can communicated with a third party device 821, which can communicate with one or more servers 860 that can have a database. The third party device 821 can be any suitable device, some of which may be similar to a user device 824, such as a tablet, display, cellular phone, or computer. In some embodiments, the wireless devices can include a processing means, a wireless transceiver, and a memory.

Another application of the system 820, pertaining primarily restaurants or other retail centers, allows a third party device 821 can be a cash register. Similarly, the third party device 821 could also be a wireless phone or other wireless device used by employees within the defined area. The third party devices 821 can be used to locate the position of a user in a defined area or in proximity to a defined area. In one example, a user could send a request for assistance within a defined area. The request will be received by one or more access nodes 850 and sent through the server 860 and can then be transmitted to a third party user device 821. The third party can then located the user within the defined area. The system can then provide information, such as directions or real-time proximity data of the third party device 821 to the user device 824, or the access nodes 850 in proximity to the user device 824.

Additionally, the system can be communicatively coupled to one or more cameras directed to monitoring the defined area. The camera can record or take images that can be used in identifying a user or non-user that may be present within the defined area. The system can then push or send the image to the third party device or a third party to aid in determining the user's location or the appropriate user.

Figure 9:
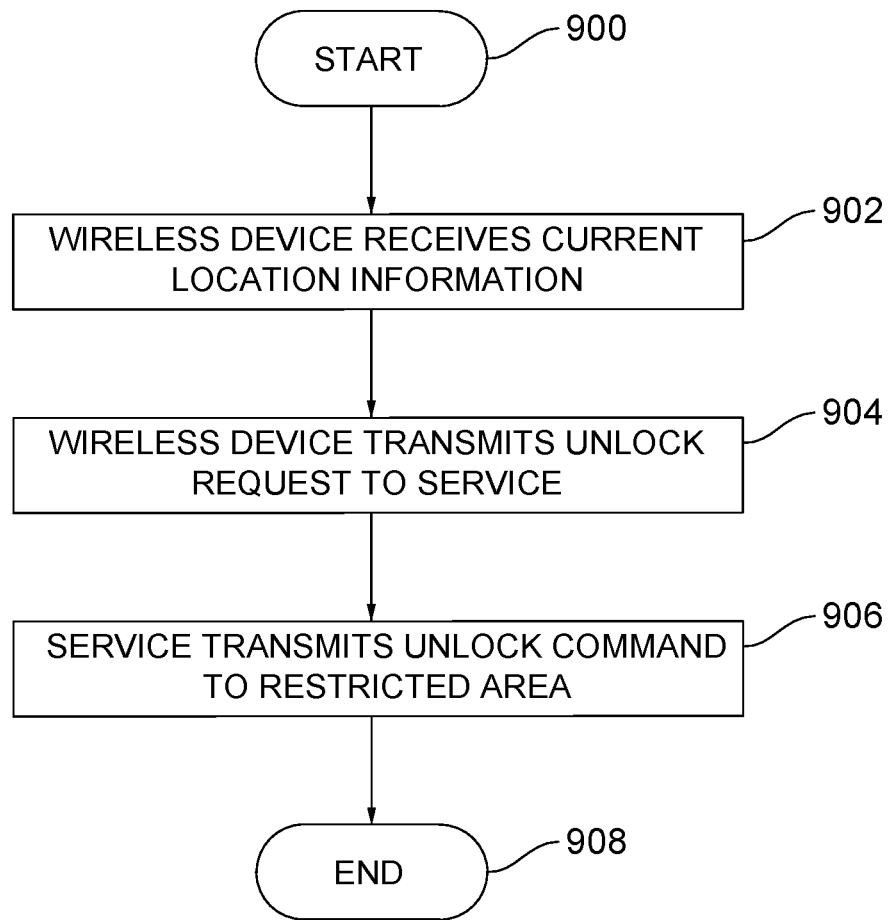
FIG. 9 is a process flow diagram illustrating one set of steps performed in providing access to a restricted area to a user using a wireless device and the novel access system.

As shown in FIG. 9, the process begins at 900 with the wireless device 824 receiving location information linked to the current location of the user and wireless device 824 from one or more access nodes 850 (stage 902). In one form, this location information is received or determined by wireless device 824 from one or more access nodes 850. The access nodes can be located near a particular structure or defined area. In one embodiment, one or access nodes 850 can broadcast a unique identifier which correspond to zones, within an area or alternatively can reference a particular item. In an alternate form, a unique identifier is sent along with a received unlock request by access node 850 which may then be used as a lookup in a location table by wireless device 824 or by server 860. As a result, an added layer of security is provided by server 860 being configured to only authorize requests from one or more access nodes 850 (which is an access node within range of the restricted or specified for a virtually restricted area) and subsequently authenticating those unlock requests received to confirm that the requesting wireless device 824 is authorized.

Depending upon the application, the restricted may be within the broadcast range of access node 850, or the node 850 may be virtual. Once the wireless device 824 is within range of and is connected to one or more access nodes 850, the wireless device 824 transmits an unlock request, which is received by one or more access nodes 850 and passed on to server 860 (stage 304). Additionally, the one or more access nodes 850 may be configured to require a predetermined signal strength prior to permitting an unlock request to be issued, to ensure that the user is in close proximity to the door which access is requested for. In the illustrated embodiment, this request is sent through internal network 854, but it shall be appreciated that the message may also be sent through another wireless network, such as 802.11 or another similar technology. The unlock request may include any of the following: user ID, location information, user name, e-wallet, etc. In addition, other information may be included in the request.

In a still further form, the one or more nodes 850 may approximate the distance between itself and wireless device 824 using a signal strength determination. A zone may then be set (including a distance minimum or min/max range) which defines the distance the user along with wireless device 824 would be from the node 850 when in an acceptable vicinity of restricted area or access node 850. If this determined distance does not match that set by the operator, then any unlock request send will not be authorized.

Once an unlock request is received by server 860, server 860 authenticates the MAC address of the wireless device as well as the validity of the current reservation and confirms the request with access node 850. Upon receiving this confirmation, access node 850 transmits an unlock command to the restricted area (step 906). Upon receiving the unlock request, the user operating wireless device 824 is enabled to access a restricted area, wherein a user can further generate a response depending upon the application of the system. The generated responses can include an unlock command, generating an e-ticket, initiating an electronic payment, generating user information, as well as other various responses to enter. The process ends at end point 908.

While the invention has been illustrated and described in detail in the drawings and foregoing description, the same is to be considered as Illustrative and not restrictive in character, it being understood that only the preferred embodiment has been shown and described and that all equivalents, changes, and modifications that come within the spirit of the inventions as described herein and/or by the following claims are desired to be protected.

Hence, the proper scope of the present invention should be determined only by the broadest interpretation of the appended claims so as to encompass all such modifications as well as all relationships equivalent to those illustrated in the drawings and described in the specification.

What is claimed is:

1. A system allowing the monitoring of a user's presence and location within an area using a wireless user device, the system comprising:
    a database storing information identifying at least one wireless user device within said area, wherein the at least one wireless user device includes a cellular radio for communicating with one or more cellular towers;
    a pressure sensitive mat within said area;
    at least one access node proximate to or within said area, wherein the at least one access node, comprises:
        an antenna configured to emit a first short-range wireless radio signal for connecting to the wireless user device, and
        a power source communicatively coupled to said antenna; and
    a server operable to receive a request associated with the wireless user device and said access node and transmit a response action to said access node or a third party user device upon receiving said request using said database;
    wherein the response action triggers a financial charge to a virtual wallet associated with the user and the request is triggered when the user reaches a pre-determined point as determined by the pressure sensitive mat.

2. The system of claim 1, further comprising at least one enclosure comprising a backing plate have a peripheral edge and a cover plate, wherein said enclosure houses said antenna and said power source, wherein said cover plate is configured to couple to said backing plate and enclose said antenna and power source, wherein said enclosure is configured to shape an RF pattern emitted by said antenna.

3. The system of claim 2, wherein said backing place is configured to shape said first short-range wireless radio signal.

4. The system of claim 1, wherein said access node, comprises:
    a first short-range wireless radio using a wireless networking standard for receiving a wireless request directly from a wireless user device; and a second short-range wireless radio using a wireless networking standard to transmit a request directly to the access node.

5. The system of claim 4, wherein said first short-range wireless radio uses first wireless networking standard for receiving a wireless access request directly from a wireless user device; and
    said second short-range wireless radio uses a second wireless networking standard which is different than said first wireless networking standard.

6. The system of claim 1, wherein said enclosure is further comprised of a power source tray.

* * * * *

UNITED STATES PATENT AND TRADEMARK OFFICE
CERTIFICATE OF CORRECTION

| | |
|---|---|
| PATENT NO. | : 10,818,119 B2 |
| APPLICATION NO. | : 15/722802 |
| DATED | : October 27, 2020 |
| INVENTOR(S) | : William Benjamin Robertson |

It is certified that error appears in the above-identified patent and that said Letters Patent is hereby corrected as shown below:

On the Title Page

Item (63) Related U.S. Application Data page 2:
Column 1, Line 6, replace "15/236,103" with --12/536,103--

Signed and Sealed this
Twenty-seventh Day of September, 2022

*Katherine Kelly Vidal*

Katherine Kelly Vidal
*Director of the United States Patent and Trademark Office*